(12) United States Patent
Savard et al.

(10) Patent No.: US 10,434,952 B2
(45) Date of Patent: Oct. 8, 2019

(54) ANCHOR FOR REMOVABLY ATTACHING A COMPONENT TO A FRAME MEMBER AND METHOD FOR USING SAME

(71) Applicant: BOMBARDIER RECREATIONAL PRODUCTS INC., Valcourt (CA)

(72) Inventors: Laurent Savard, Granby (CA); Patrick Mathieu, Granby (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 49 days.

(21) Appl. No.: 15/792,294

(22) Filed: Oct. 24, 2017

(65) Prior Publication Data

US 2019/0009732 A1 Jan. 10, 2019

Related U.S. Application Data

(60) Provisional application No. 62/530,532, filed on Jul. 10, 2017.

(51) Int. Cl.
| | |
|---|---|
| *B60N 99/00* | (2006.01) |
| *B60R 11/00* | (2006.01) |
| *F16B 13/02* | (2006.01) |
| *B62D 21/00* | (2006.01) |
| *B62D 21/18* | (2006.01) |
| *B62D 23/00* | (2006.01) |

(52) U.S. Cl.
CPC .............. *B60R 11/00* (2013.01); *B62D 21/00* (2013.01); *B62D 21/183* (2013.01); *B62D 23/005* (2013.01); *F16B 13/02* (2013.01); *B60R 2011/0052* (2013.01)

(58) Field of Classification Search
CPC . B60R 11/00; B60R 2011/0052; B62D 21/00; F16B 13/02
See application file for complete search history.

(56) References Cited

U.S. PATENT DOCUMENTS

| 4,506,419 | A | * | 3/1985 | Mitomi | ................... | F16B 21/02 |
|---|---|---|---|---|---|---|
| | | | | | | 24/289 |
| 4,573,337 | A | * | 3/1986 | Papesh | ..................... | B21D 1/14 |
| | | | | | | 72/305 |
| 2014/0103627 | A1 | * | 4/2014 | Deckard | .................. | B60N 2/90 |
| | | | | | | 280/807 |

* cited by examiner

*Primary Examiner* — Lori L Lyjak
(74) *Attorney, Agent, or Firm* — BCF LLP

(57) ABSTRACT

An anchor for removably attaching an accessory to a frame member having an outer surface and a slot defined in the outer surface. The anchor comprises a body that has a surface that is generally complementary in shape to a portion of the outer surface of the frame member that surrounds the slot, a shank that from the surface, the shank being sized to be received in the slot and defining an aperture extending from a free end of the shank toward the surface. The aperture is adapted to receive a fastener. The anchor also includes at least one projection extending from a side of the shank. A vehicle having the frame member and the anchor is provided. A method of attaching a component to a frame member using the anchor is provided.

25 Claims, 18 Drawing Sheets

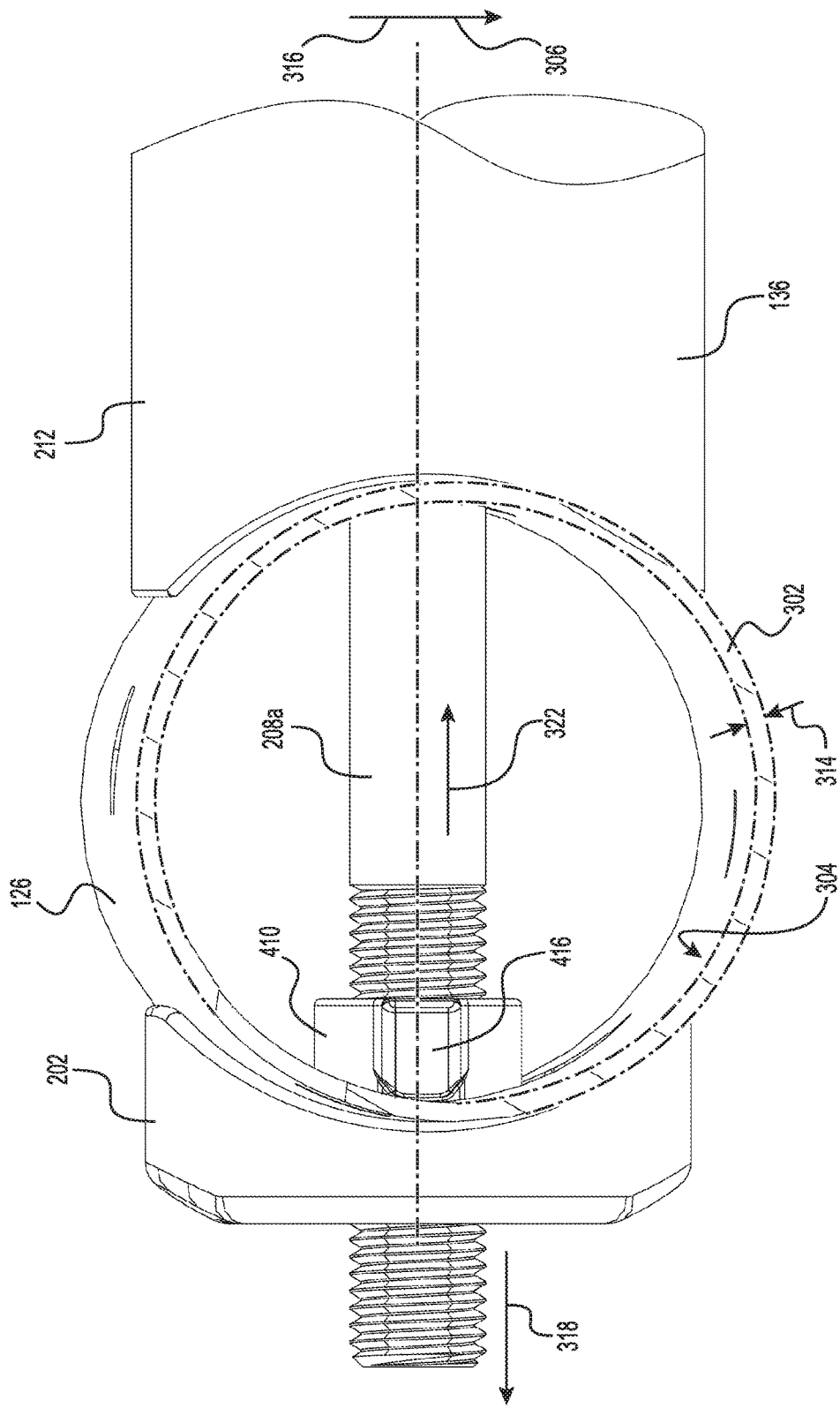

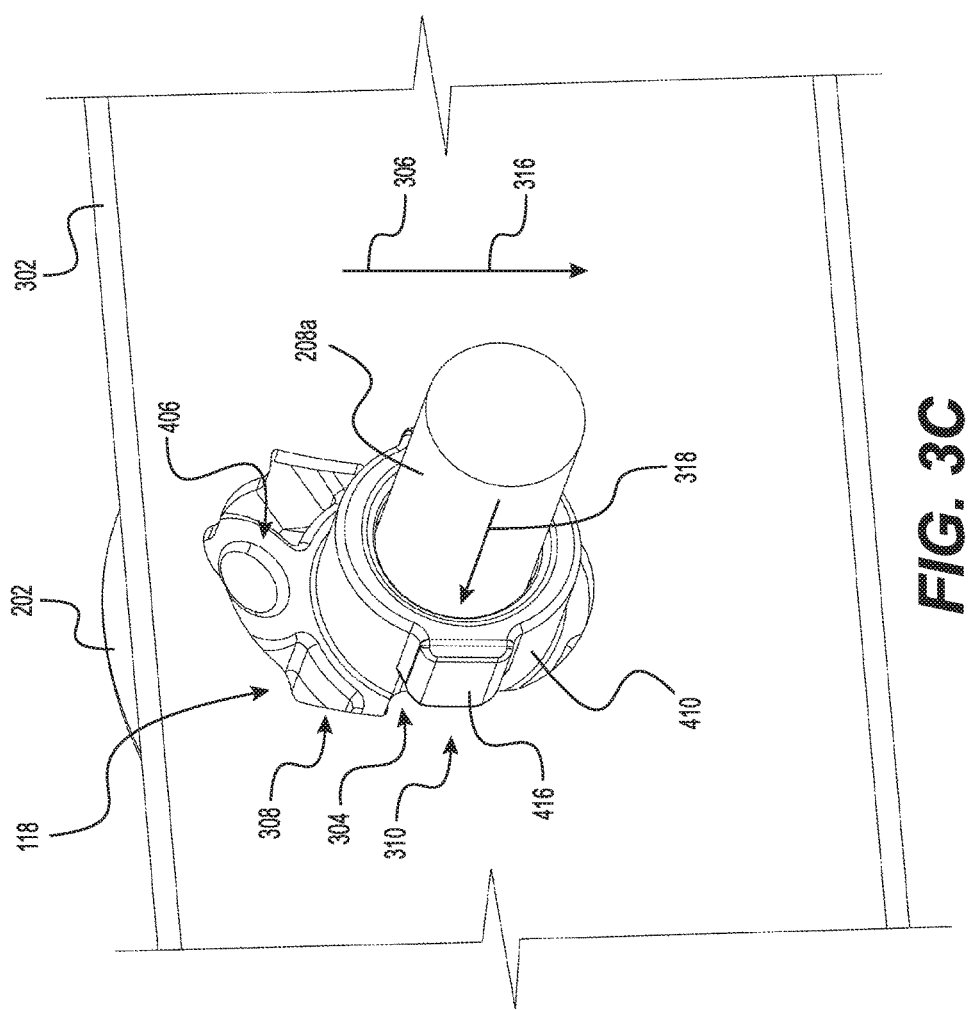

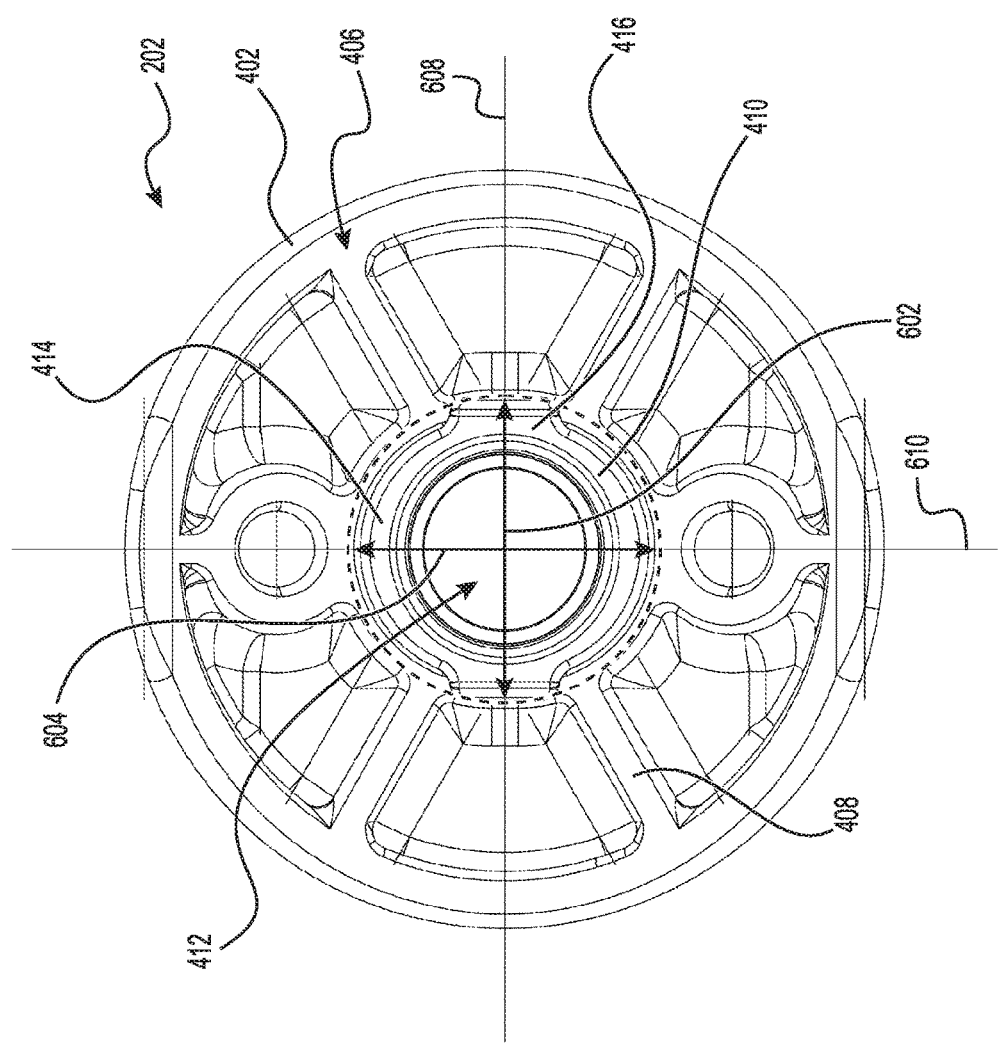

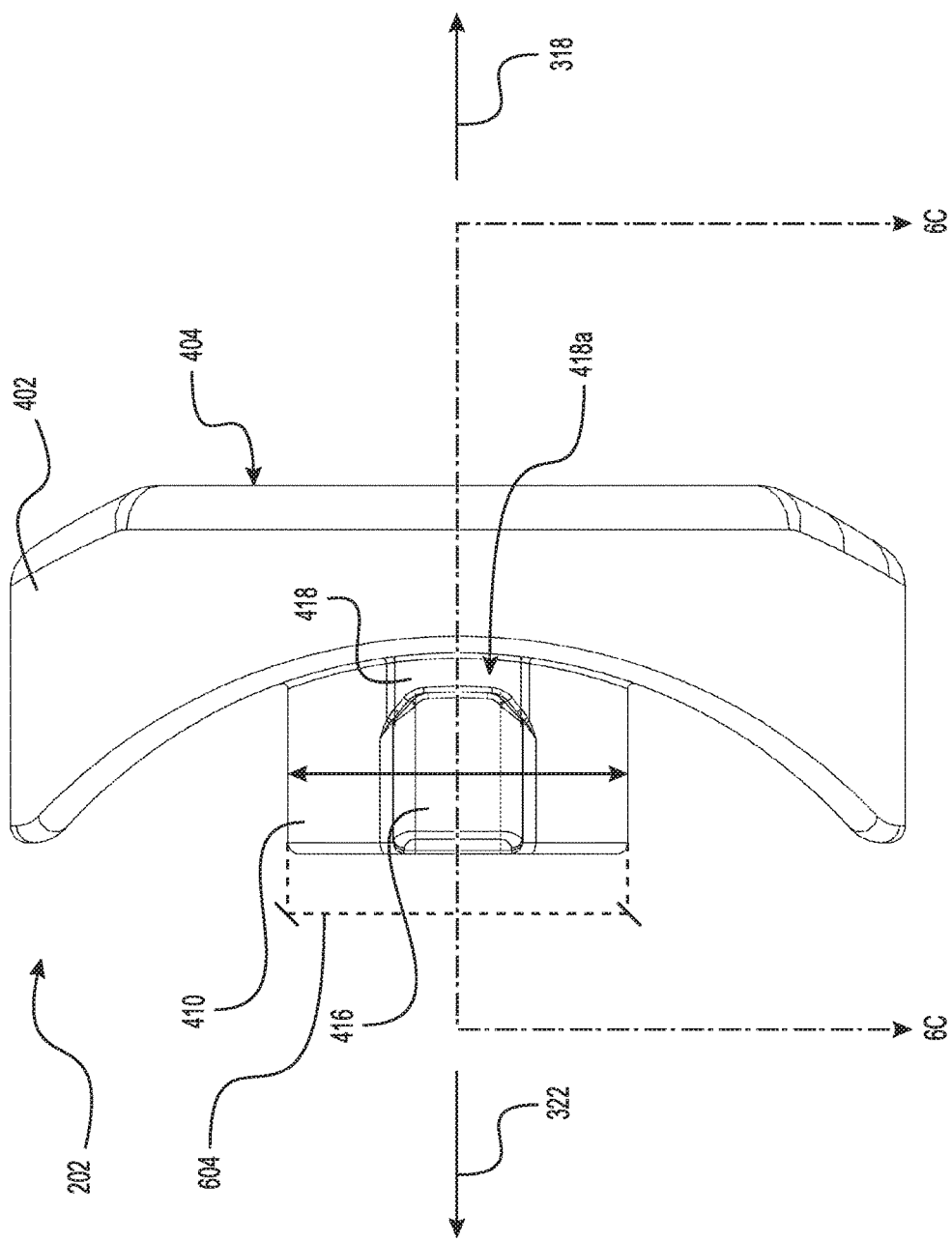

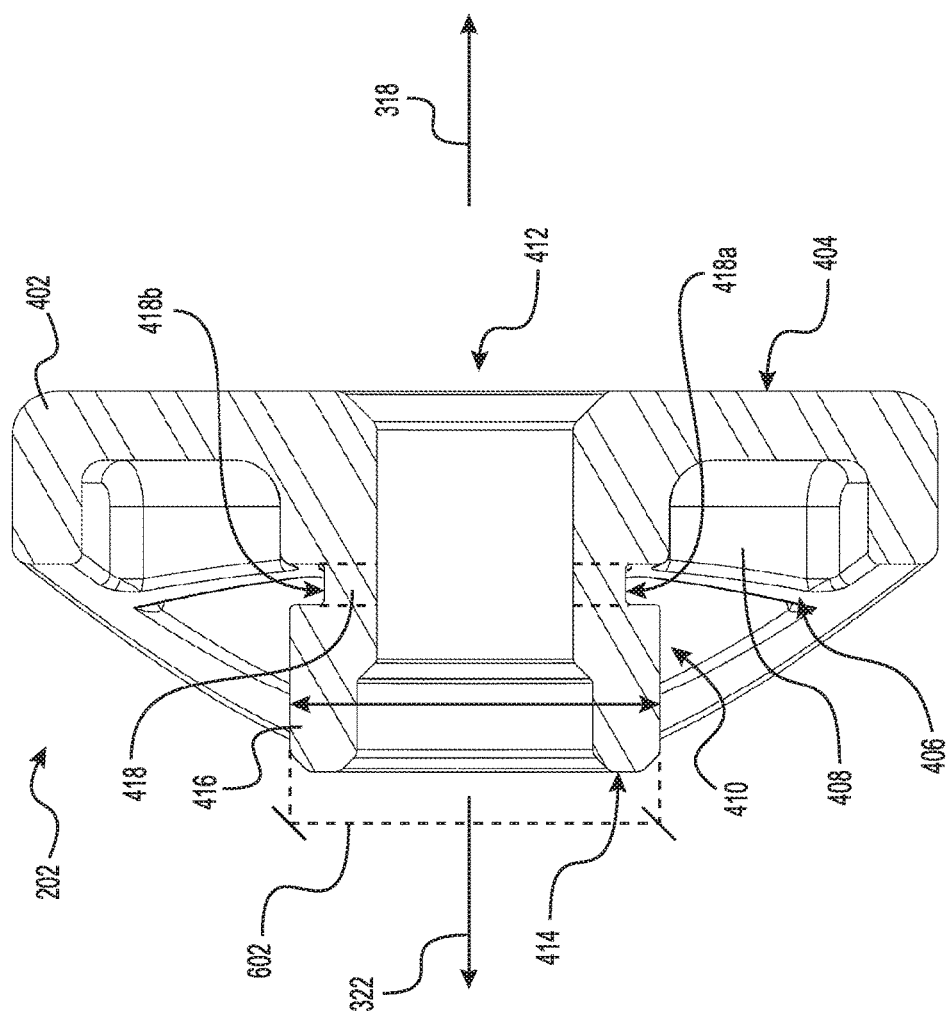

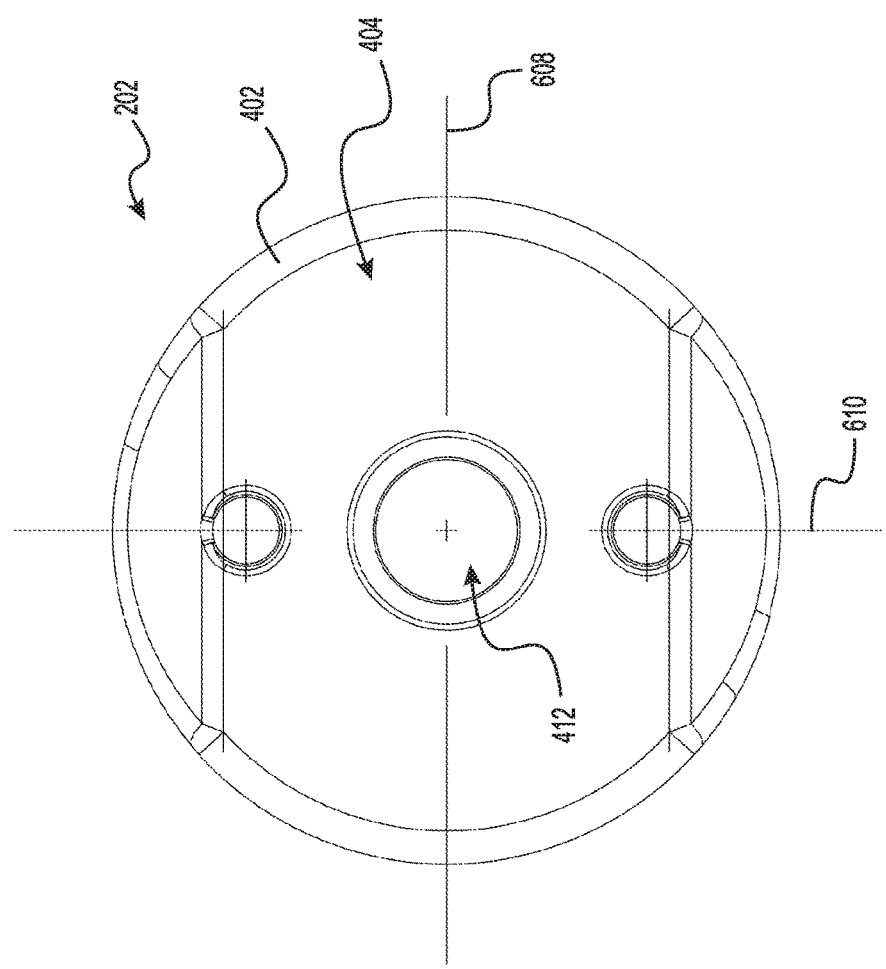

ANCHOR FOR REMOVABLY ATTACHING A COMPONENT TO A FRAME MEMBER AND METHOD FOR USING SAME

CROSS-REFERENCE

The present application claims priority to U.S. Provisional Patent Application No. 62/530,532, entitled "Anchor for Removably Attaching a Component to a Frame Member and Method for Using Same", filed Jul. 10, 2017, the entirety of which is incorporated herein by reference.

TECHNICAL FIELD

The present technology relates to an anchor for removably attaching a component to a frame member, and methods for using same.

BACKGROUND

When attaching accessories to a vehicle frame, the vehicle frame is not always easily accessible. Some accessory attachment methods include surrounding a frame member of the vehicle frame to which an accessory is to be attached with one or more clamps and tightening the clamp(s) to attach the accessory to that frame member. Typically, such methods require more than one clamp in order to prevent the accessory from rotating around the frame member, especially when the frame member has a circular cross-section.

Other methods of attaching an accessory to a frame member consist in passing a bolt through the accessory and the frame member to which the accessory is to be attached and threading the bolt into a nut on an opposite side of the frame member. One challenge with these methods is holding the nut in place while trying to thread the bolt into the nut, or holding the bolt in place while trying to thread the nut onto the bolt.

Another challenge with such methods of attaching an accessory to a frame member is engaging the nut with a tool and retaining the nut in the tool to hold the nut in place while tightening the bolt. This can be cumbersome in some areas of some vehicle frames, such as the lower frame portions of the vehicle frames for example. Another challenge with such methods of attaching an accessory to a frame member is that at least some vehicle frames are made of frame members that have relatively thin walls. For example, some off-road vehicles have vehicle frame members with 1.4-millimeter wall thickness. Passing a bolt through a frame member that has this wall thickness and tightening the head of the bolt against such the frame member may deform the 1.4-millimeter wall of the frame member.

Other methods of attaching an accessory to a frame member consist in welding nuts or other parts to the vehicle frame during manufacturing of a vehicle, to allow for accessories to be attached to the vehicle frame at some point during the useful life of the vehicle. One challenge with such methods is that they involve permanently adding parts to the vehicle during manufacturing, which parts may end up never being used if no accessories are added using them. In some cases, permanently adding such parts without ever using them unnecessarily increases the vehicle's weight. In some cases, this affects the vehicle's appearance at least while the part(s) are unused. In some cases this also increases the manufacturing cost of the vehicle.

In view of the above drawbacks, it may be desirable to provide a device for attaching components to frame members, and a corresponding method of attaching components to frame members.

SUMMARY

It is an object of the present technology to ameliorate at least some of the inconveniences present in the prior art.

The present technology provides an anchor with a shank. The shank has an aperture extending therein. The aperture is adapted to receive a fastener. At least one projection protrudes from a side of the shank. The at least one projection is dimensioned to be inserted into a frame member through a slot defined in an outer surface of the frame member.

In some implementations, the slot has a wider portion and a narrower portion extending from the wider portion. The at least one projection is sized to fit into the wider portion of the slot and not into the narrower portion of the slot.

In some implementations, the shank is dimensioned to fit into the wider portion of the slot and then slide into the narrower portion of the slot. The at least one projection prevents the anchor from falling out of the narrower portion of the slot.

In some implementations, the shank has two projections.

In some implementations, the surface of the anchor that contacts the frame member when the anchor is in use is generally complementary in shape to a portion of an outer surface of the frame member that surrounds the slot. This helps prevent the anchor from rotating about the shank while a fastener is being threaded into the aperture in the shank.

In some implementations, the shank of the anchor has at least one flat surface and is dimensioned such that when the shank is received in the narrower portion of the slot, the at least one flat surface reduces or prevents rotation of the shank in the narrower portion of the slot.

In some cases, the anchor helps reduce a need of the user to hold the anchor in place while fastening a component to a frame member using the anchor. It is contemplated that the frame member can be any frame member. It is contemplated that component can be any component. For example, the component could be a vehicle accessory or another frame member. These examples are non-limiting.

According to another aspect of the present technology, there is provided an anchor for removably attaching a component to a frame member having an outer surface and a slot defined in the outer surface. The anchor has a body with a first surface and a second surface opposite the first surface. A shank extends from the second surface and is sized to be received in the slot. The shank defines an aperture extending from a free end of the shank toward the first surface. The aperture is adapted to receive a fastener. At least one projection extends from a side of the shank. The at least one projection is spaced from the second surface.

In some implementations of the present technology, the aperture is threaded.

In some implementations of the present technology, the aperture extends to the first surface.

In some implementations of the present technology, the second surface is generally complementary in shape to a portion of the outer surface surrounding the slot.

In some implementations of the present technology, the second surface is generally concave.

In some implementations of the present technology, the at least one projection is at least two projections.

In some implementations of the present technology, the at least two projections are positioned symmetrically about the shank.

In some implementations of the present technology, the anchor is symmetric about a line passing through the at least one projection and the shank.

In some implementations of the present technology, the shank has a diameter defined by an outer surface of the shank, and the at least two projections define a reference diameter that is larger than the diameter of the shank.

In some implementations of the present technology, the slot has a first portion and a second portion extending downward from the first portion, a width of the second portion is smaller than a width of the first portion, and the reference diameter is greater than the width of the second portion.

In some implementations of the present technology, the slot is defined in an outer wall of the frame member, and the at least two projections are spaced from the second surface by a distance larger than a thickness of the outer wall proximate the slot.

According to another aspect of the present technology, there is provided a component assembly that includes a component, an anchor, and a fastener. The anchor has a body having a first surface and a second surface opposite the first surface, a shank extending from the second surface, and at least one projection extending from a side of the shank. The at least one projection is spaced from the second surface. The shank is sized to be received in a slot defined in an outer surface of a frame member and defines an aperture extending from a free end of the shank toward the first surface. The fastener is received through the component and into the aperture of the shank for fastening the component to the frame member.

In some implementations of the present technology, the aperture is threaded and the fastener is threaded into the aperture.

In some implementations of the present technology, the aperture extends to the first surface.

In some implementations of the present technology, the at least one projection is at least two projections.

In some implementations of the present technology, the second surface is generally complementary in shape to a portion of the outer surface surrounding the slot.

In some implementations of the present technology, the second surface is generally concave.

In some implementations of the present technology, the component is a vehicle accessory.

According to another aspect of the present technology, there is provided a vehicle, having a vehicle frame, at least two ground-engaging members operatively connected to the vehicle frame, an anchor, and a vehicle component. The vehicle frame has a frame member. The frame member has an outer surface. A slot is defined in the outer surface and a frame aperture is defined in the outer surface opposite the slot. The anchor has a body having a first surface and a second surface opposite the first surface, a shank extending from the second surface, and at least one projection extending from a side of the shank. The shank defines an aperture extending from a free end of the shank toward the first surface. The shank is received in the slot. The at least one projection is spaced from the second surface and is positioned inside the frame member. At least a portion of the frame member is positioned between the at least one projection and the second surface. The vehicle component is positioned at least in part over the frame aperture. A fastener is received through the vehicle component, the frame aperture, inside the frame member and in the aperture of the shank of the anchor for fastening the vehicle component to the frame member.

In some implementations of the present technology, the aperture of the shank extends to the first surface of the anchor and the fastener extends through the aperture of the shank.

In some implementations of the present technology, the second surface of the anchor is generally complementary in shape to a portion of the outer surface of the frame member surrounding the slot.

In some implementations of the present technology, the slot has a first portion and a second portion, the first portion is sized to permit passage of the shank and the at least one projection therethrough, the second portion is sized to receive the shank therein and to prevent passage of the at least one projection therethrough, and the shank is positioned in the second portion when fastened to the fastener.

In some implementations of the present technology, the second portion is vertically below the first portion.

In some implementations of the present technology, the vehicle component is a vehicle accessory.

According to another aspect of the present technology, there is provided a method of attaching a component to a frame member, the frame member having an outer surface, a slot defined in the outer surface and a frame aperture defined in the outer surface opposite the slot. The method includes inserting a shank and at least one projection of an anchor into a first portion of the slot, the at least one projection extending from a side of the shank. The method further includes moving the anchor relative to the frame member such that the shank moves from the first portion of the slot into a second portion of the slot, and at least a portion of the frame member is positioned between the at least one projection and a body of the anchor. The method further includes positioning the component at least in part over the frame aperture, and fastening the component to the frame member by inserting a fastener through the component, the frame aperture, inside the frame member and into an aperture defined in the shank.

For purposes of this application, terms related to spatial orientation such as forwardly, rearward, upwardly, downwardly, left, and right, are as they would normally be understood by a driver of the vehicle sitting thereon in a normal riding position. Terms related to spatial orientation when describing or referring to components or sub-assemblies of the vehicle, separately from the vehicle should be understood as they would be understood when these components or sub-assemblies are mounted to the vehicle, unless specified otherwise in this application.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings.

In the drawings:

FIG. 3B is a cross-section of the portion of the vehicle frame of FIG. 2, taken along line 3B-3B of FIG. 2;

FIG. 3C is a perspective view taken from a rear, right side to a cross-section of the portion of the vehicle frame of FIG. 2, taken along line 3C-3C of FIG. 2;

FIG. 6A is a right side elevation view of the anchor of FIG. 4;

FIG. 6B is a front elevation view of the anchor of FIG. 4;

FIG. 6C is a cross-sectional view of the anchor of FIG. 6B, taken along line 6C-6C of FIG. 6B;

FIG. 7 is a left side elevation view of the anchor of FIG. 4; and

DETAILED DESCRIPTION

Figure 1A:
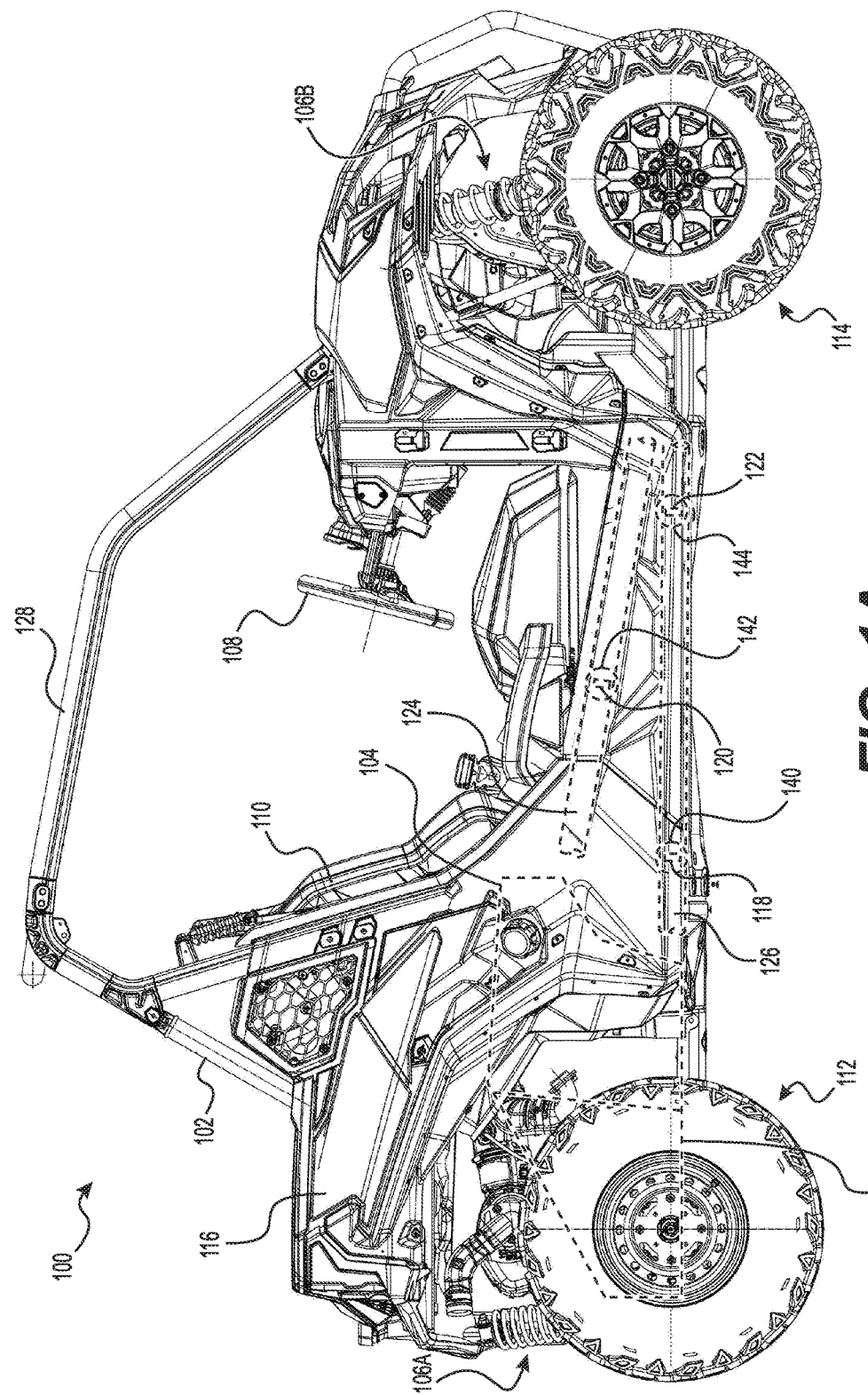
FIG. 1A is a right side elevation view of a vehicle.

The present technology will be described with reference to its use in attaching a pair of rock sliders 136 to a side-by-side vehicle 100. It is contemplated that the present technology could have uses outside of the recreational vehicle industry, could be used to attach vehicle accessories other than rock sliders and could be used to attach components other than vehicle accessories.

The vehicle 100 is what is referred to as a side-by-side vehicle (SSV). The vehicle 100 has a vehicle frame 102 that supports a motor 104, a transmission 104*a*, a suspension system 106, a steering wheel 108, a driver seat (not shown), and a passenger seat 110. The driver seat is a mirror image of the passenger seat 110. It is contemplated that the vehicle 100 could be any other vehicle, including another powered vehicle such as an automobile or a bicycle.

Rear and front suspension systems 106A, 106B connect two rear wheels 112 and two front wheels 114 to the vehicle frame 102, respectively. The wheels 112, 114 are operatively connected to the motor 104 via the transmission 104*a* and are driven by the motor 104. The two front wheels 114 are operatively connected to the steering wheel 108 via a steering system (not shown) and are steerable via operation of the steering wheel 108 to steer the vehicle 100.

The vehicle frame 102 includes tubular frame members 124, 126 on the right side of the vehicle 100. It is contemplated that the frame members 124, 126 could be non-tubular, could have a non-circular cross-section, and could have any other cross-section. For example, the frame members 124, 126 could have an elliptical, a square, a rectangular, or a triangular cross-section.

The vehicle frame 102 includes tubular frame members corresponding to the frame members 124, 126 on a left side of the vehicle 100. The vehicle frame 102 includes many other frame members, such as those forming the roll cage 128, but these will not be described herein. The vehicle frame 102 is made of metal and the frame members 124, 126 are welded to other parts of the vehicle frame 102. It is contemplated that the frame members 124, 126 could be attached to the other parts of the vehicle frame 102 using one or more different attachment mechanisms.

Panels 116 are made of plastic, define an overall design of the vehicle 100 and at least partially cover some of the vehicle's components, such as the motor 104 and the vehicle frame 102. It is contemplated that the panels 116 could be made of any other suitable material.

It is sometimes desired to attach one or more components to the vehicle 100. In the present implementation, these components are two rock sliders to be attached to the vehicle frame 102. The rock sliders are designed to deflect and absorb impacts that would otherwise be imparted to the parts of the vehicle 100 covered by the rock sliders.

Figure 1B:
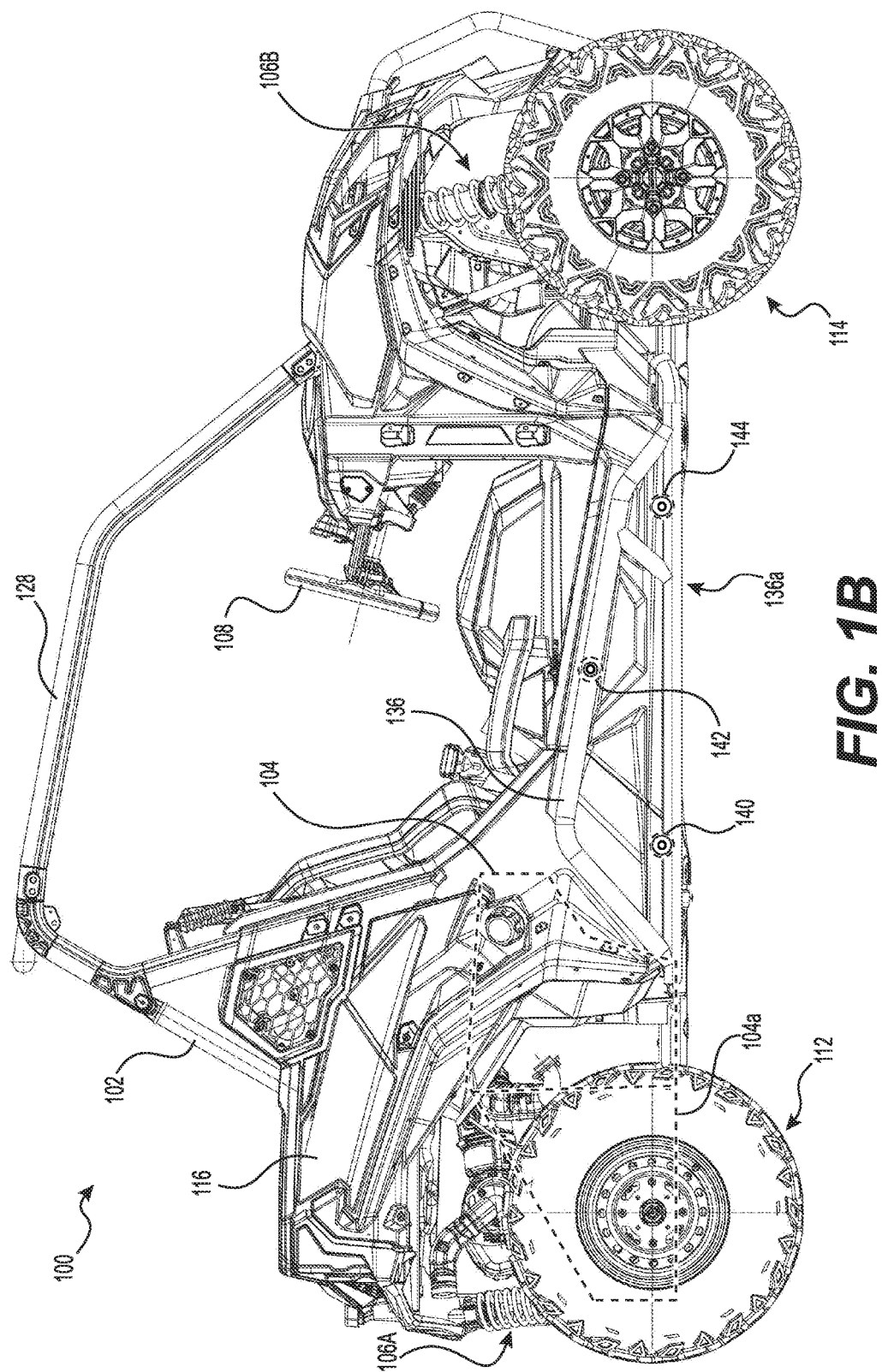
FIG. 1B is a right side elevation view of the vehicle of FIG. 1A, with rock sliders attached to a vehicle frame of the vehicle.
Figure 2:
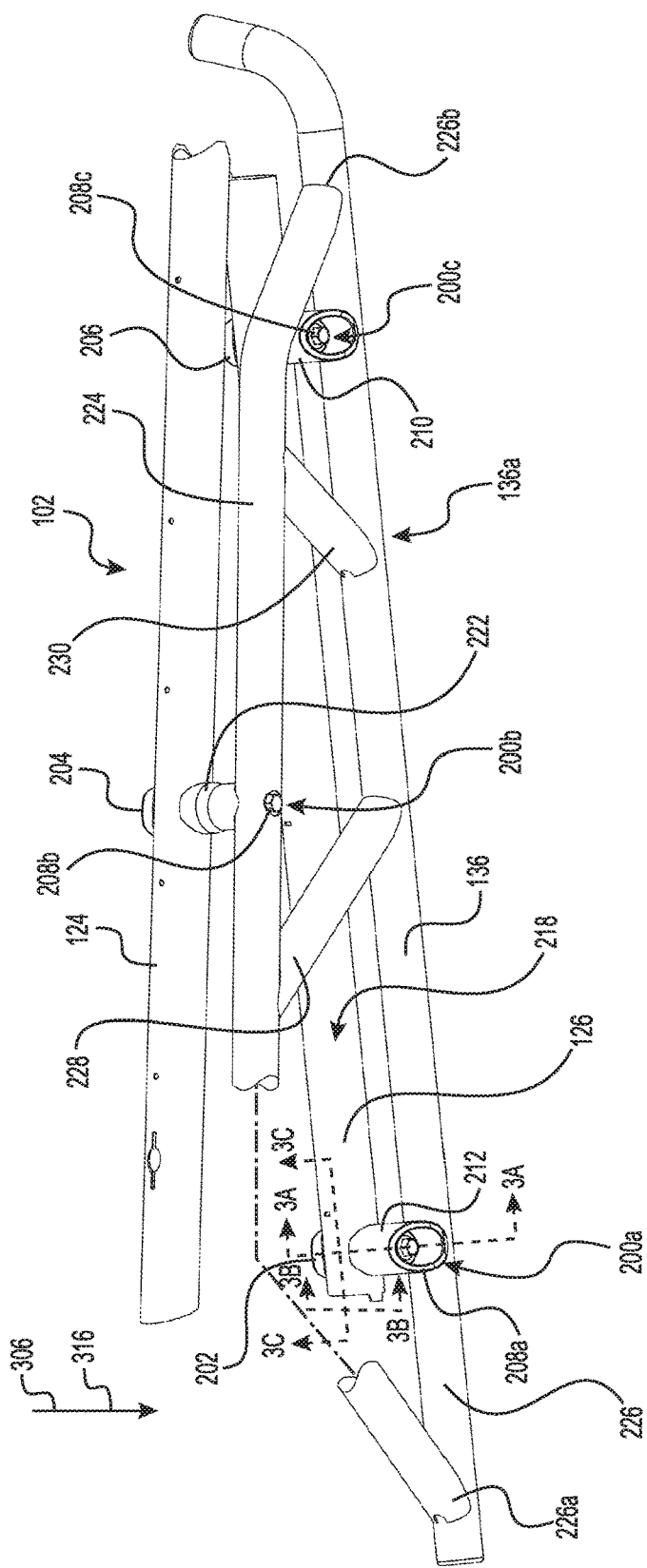
FIG. 2 is a perspective view taken from a top, right side of a rock slider assembly attached to a portion of the vehicle frame of the vehicle of FIG. 1B with vehicle panels removed.

FIG. 1B shows the vehicle 100 with a rock slider 136 attached to the right side of the vehicle frame 102. The rock slider 136 is attached to the frame members 124, 126 with three anchors 202, 204, 206 (FIG. 2).

Another rock slider (not shown) is attached to a left side of the vehicle frame 102 to the frame members corresponding to the frame members 124, 126 with three corresponding anchors (not shown). The other rock slider is a mirror image of the rock slider 136. As such, for simplicity, only the right rock slider 136 will be described herein. It is contemplated that more or fewer than three anchors 202, 204, 206 could be used to attach the rock slider 136 to the vehicle frame 102.

The rock slider 136 has a plurality of metallic tubular frame members 136*a*. The frame members 136*a* include an inverted-U shape upper member 224, a generally straight lower member 226, two cross members 228 and 230, and three transverse members 210, 212 and 222. The lower member 226 is welded to the upper member 224 at two points 226*a* and 226*b*.

The two cross members 228, 230 are positioned between the points 226*a* and 226*b* and are welded to the upper member 224 at one end and to the lower member 226 at another end. The transverse member 222 is welded at one end to the upper member 224 near a center thereof. Each of the two transverse members 212 and 210 is welded at one end to a top of the lower member 226 proximate a corresponding one of the two points 226*a*, 226*b*.

It is contemplated that the frame members 136*a* could be made of any other suitable material and could be interconnected using any other suitable mechanism. It is contemplated that the frame members 136*a* could be positioned relative to each other in an arrangement that is different from the arrangement described above. It is contemplated that the rock slider 136 could have more or less frame members 136*a* than described above.

As best shown in FIG. 2, the rock slider 136 also has three apertures 200*a*, 200*b*, 200*c*. The aperture 200*a* is defined in the transverse member 212 and extends through the transverse member 212 (see FIG. 3A). The aperture 200*b* is defined in the transverse member 222 and extends through the transverse member 222. The aperture 200c is defined in the transverse member 210 and extends through the transverse member 210.

Three bolts 208a, 208b, 208c that correspond to the three apertures 200a, 200b, 200c are received through the apertures 200a, 200b, 200c, respectively. It is contemplated that the rock slider 136 could have fewer or more apertures and correspondingly fewer or more bolts. The bolts 208a, 208b, 208c attach the rock slider 136 to corresponding ones of the frame members 124, 126 via corresponding ones of the anchors 202, 204, 206, as will be described in more detail below.

The bolts 208a, 208b, 208c are an example of one type of fastener that could be used. It is contemplated that a different type of fastener could be used to attach the rock slider 136 to the frame members 124, 126 via the anchors 202, 204, 206.

Each of the three anchors 202, 204, 206 is received in a corresponding one of three slots 118, 120, 122 (see FIG. 1A). The slots 118 and 122 are defined in the frame member 126. The slot 120 is defined in the frame member 124. The slots 118, 120, 122 are made in the respective frame members 124, 126 during manufacturing of the vehicle 100 using a laser cutter. It is contemplated that other methods of making the slots 118, 120, 122 could be used. It is contemplated that the slots 118, 120, 122 could be made in the respective frame members 124, 126 as a modification to the vehicle 100.

There are also frame apertures defined in the corresponding ones of the frame members 124, 126 opposite corresponding ones of the slots 118, 120, 122 on the left side and the right side of the vehicle 100. In the present implementation, each of the frame apertures corresponds to one of the slots 118, 120, 122 on the left side and the right side of the vehicle 100.

Figure 3A:
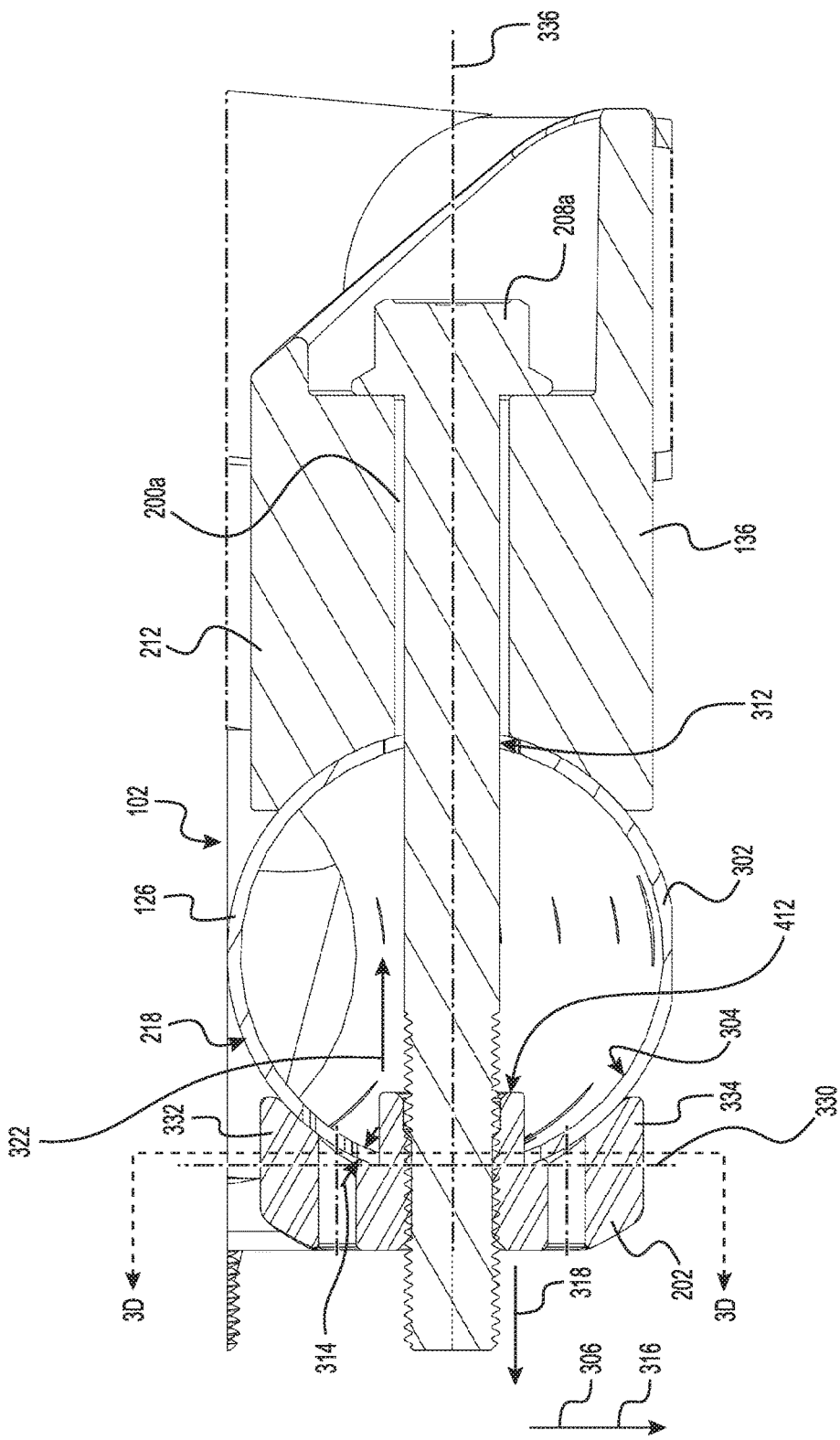
FIG. 3A is a cross-sectional view of the rock slider and the portion of the vehicle frame of FIG. 2, taken along line 3A-3A of FIG. 2.
Figure 8:
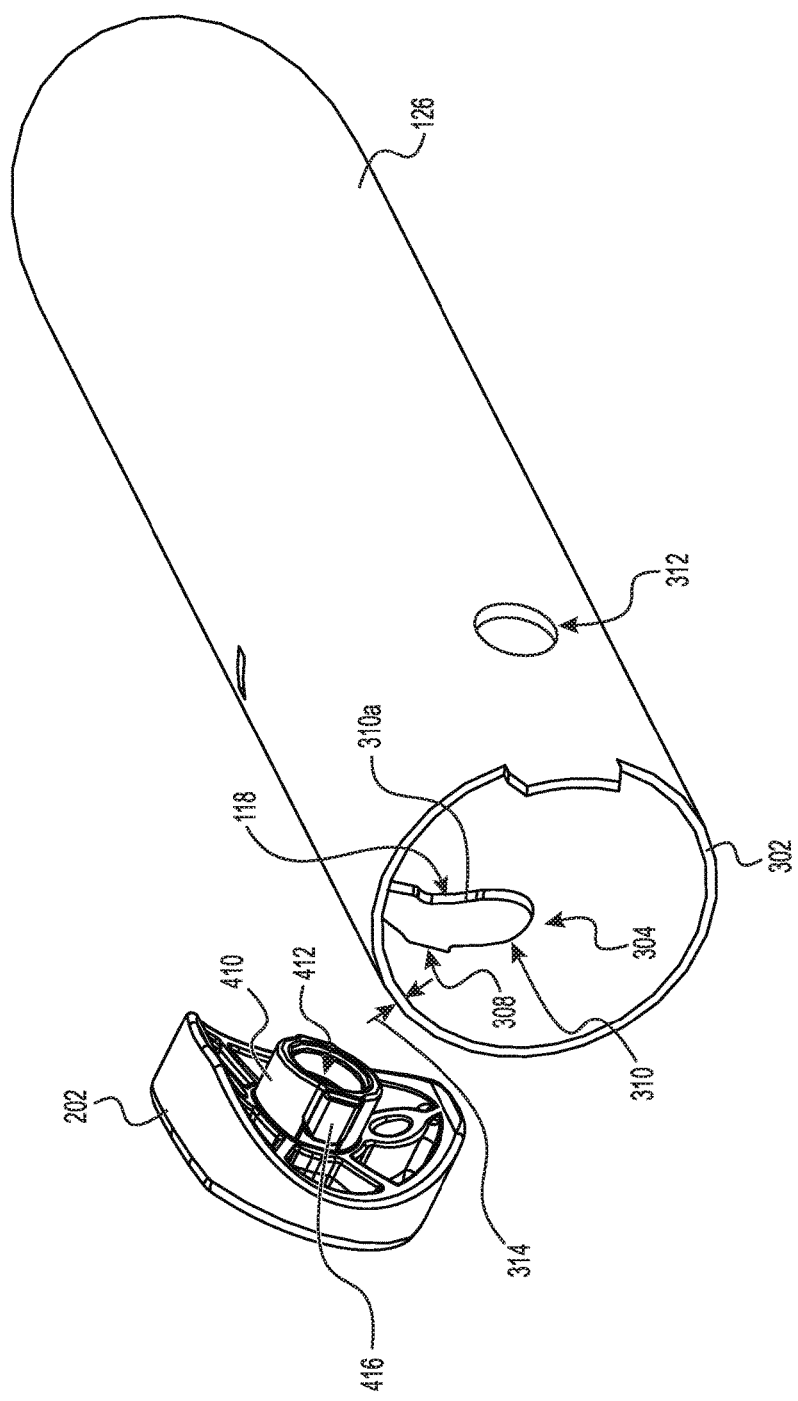
FIGS. 8 to 11 illustrate various steps of a method of attaching the rock slider to the portion of the vehicle frame of FIG. 2 using the anchor of FIG. 4.
Figure 9:
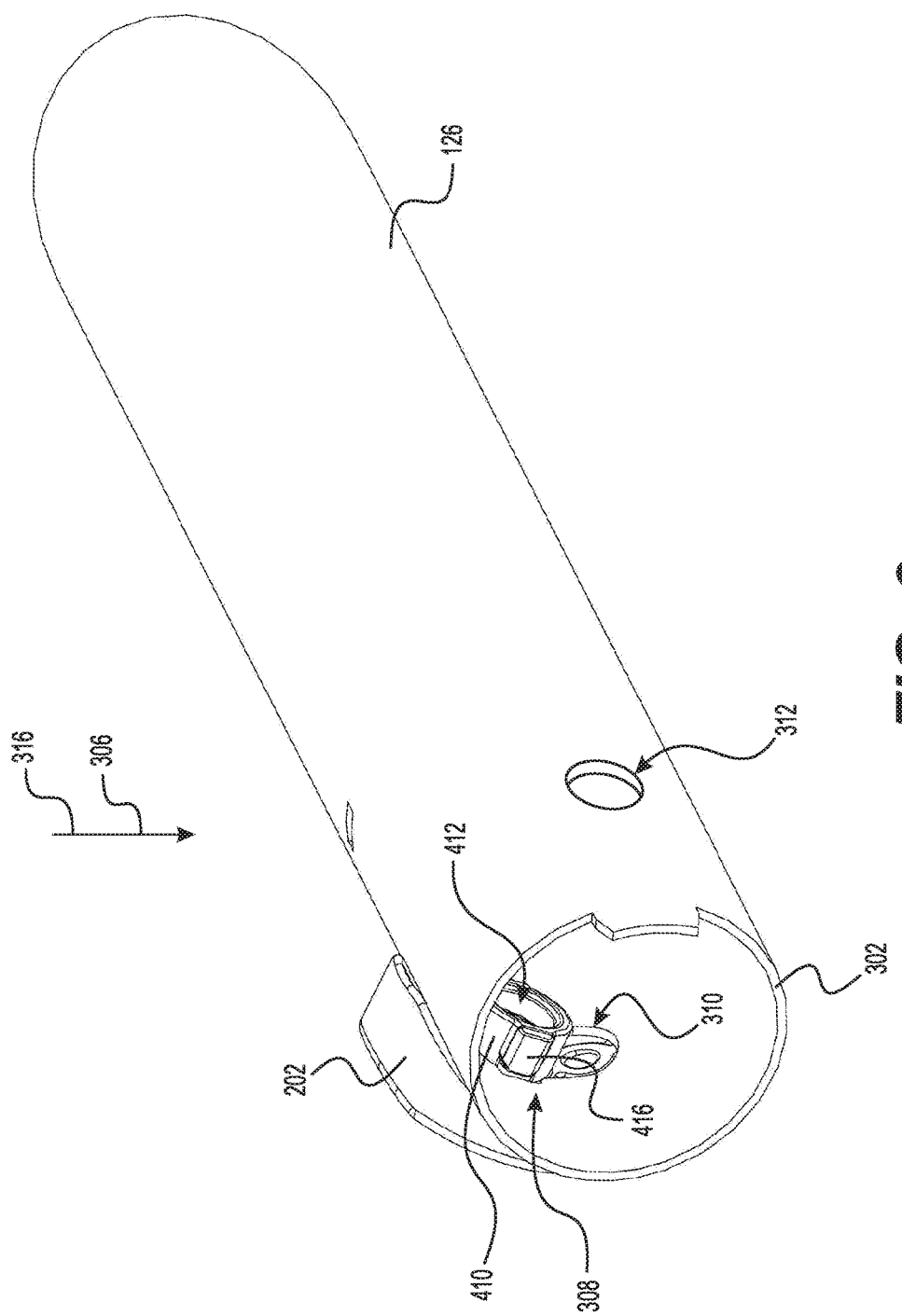

In the present implementation, the frame apertures are identical to each other. Therefore, for simplicity, only the frame aperture 312 (FIG. 3A) that corresponds to the slot 118 is described herein in detail. It is contemplated that the frame apertures could differ from each other. As best shown in FIGS. 3A, 8 and 9, the frame aperture 312 is defined in the frame member 126 opposite the slot 118. The frame aperture 312 is circular, but could have any other shape. Similar to the slot 118, the frame aperture 312 is provided during manufacturing of the vehicle 100, but could be provided as a modification to the vehicle 100.

Reference is now made to FIG. 2. In the present implementation, the transverse members 210, 212, 222 are identical to each other, the anchors 202, 204, 206 are identical to each other and the slots 118, 120, 122 are identical to each other. Therefore, for simplicity, only the anchor 202, the corresponding slot 118 and the transverse member 212 will be described in more detail herein. It is contemplated that the anchors 202, 204, 206 could differ from each other. It is contemplated that the slots 118, 120, 122 could differ from each other. It is also contemplated that the transverse members 210, 212, 222 could differ from each other.

Turning now to FIGS. 4 to 7, the anchor 202 will be described in more detail. The anchor 202 has a body 402 and a shank 410 extending from a surface 406 of the body 402. The body 402 also has a surface 404 opposite the surface 406. The anchor 202 is made of metal via casting. It is contemplated that the anchor 202 could be made of any other suitable material via any other suitable manufacturing method.

The surface 406 is generally complementary in shape to a portion of the outer surface 218 of the frame member 126 that surrounds the slot 118. More particularly, in some implementations, the shape of the surface 406 depends on the shape of a portion of the outer surface 218 of the frame member 126 that surrounds the slot 118.

If, for example, the portion of the outer surface 218 that surrounds the slot 118 was flat, the surface 406 would be flat. As another example, if the portion of the outer surface 218 that surrounds the slot 118 was rectangular, the surface 406 would be L-shaped, a C-shaped channel or flat and would fit over the rectangular portion of the outer surface 218 of the frame member 126 that surrounds the slot 118. In some cases, this helps prevent the anchor 202 from rotating about the shank 410 while the bolt 208a is being threaded into the aperture 412 in the shank 410.

In the present implementation, as shown in FIGS. 3A and 3B, since the portion of the outer surface 218 that surrounds the slot 118 is convex (due to the frame member 126 being tubular), the surface 406 of the anchor 202 is concave.

The body 402 has a plurality of ribs 408. The surface 406 is defined by an outer surface of the ribs 408. The ribs 408 define cavities in the body, thus reducing an amount of material required to form the body 402, and a weight of the body 402, while maintaining the body 402 sufficiently strong for its intended purpose. It is contemplated that the body 402 could not be provided with ribs 408 and be filled by material between the two surfaces 404, 406.

The shank 410 defines an aperture 412 extending from a free end 414 of the shank 410 toward the surface 404. In the present implementation, the aperture 412 is threaded and extends to the surface 404 such that the aperture 412 extends through the entire body 402. It is contemplated that the aperture 412 could extend through only a part of the body 402 and not through the entire body 402.

The anchor 202 has two projections 416 extending from a side of the shank 410. The projections 416 are positioned symmetrically about the shank 410 and define a reference diameter 602 (FIG. 6C) that is larger than a diameter 604 of the shank 410 (FIG. 6B). It is contemplated that the projections 416 could be positioned asymmetrically about the shank 410.

The projections 416 are trapezoid in shape. It is contemplated that the projections 416 could have a different shape. It is contemplated that the anchor 202 could have a different number of projections, including a single projection. It is also contemplated that the single projection could be a ring surrounding the shank 410.

Figure 3D:
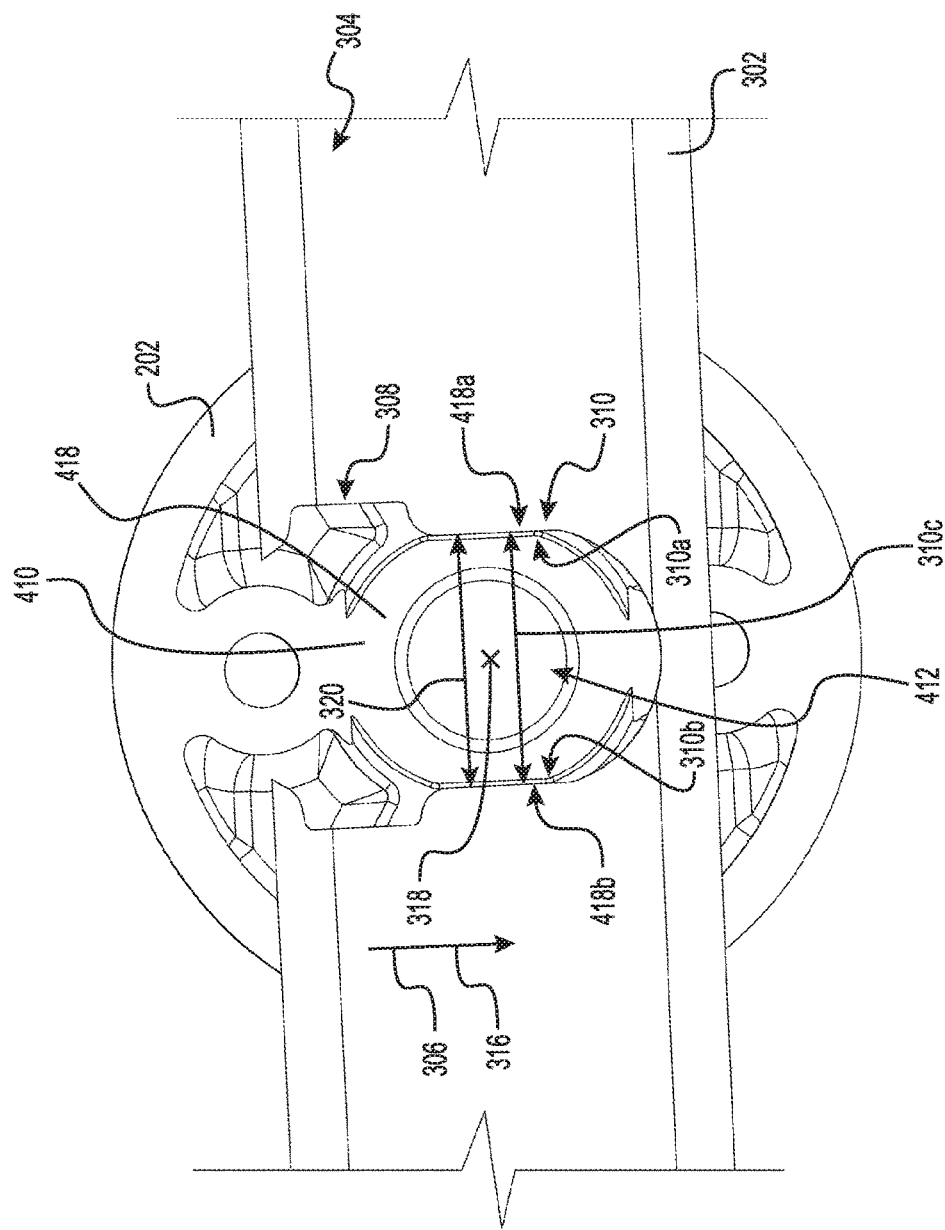
FIG. 3D is a cross-sectional view of the portion of the vehicle frame of FIG. 2, taken along line 3D-3D of FIG. 3A.
Figure 4:
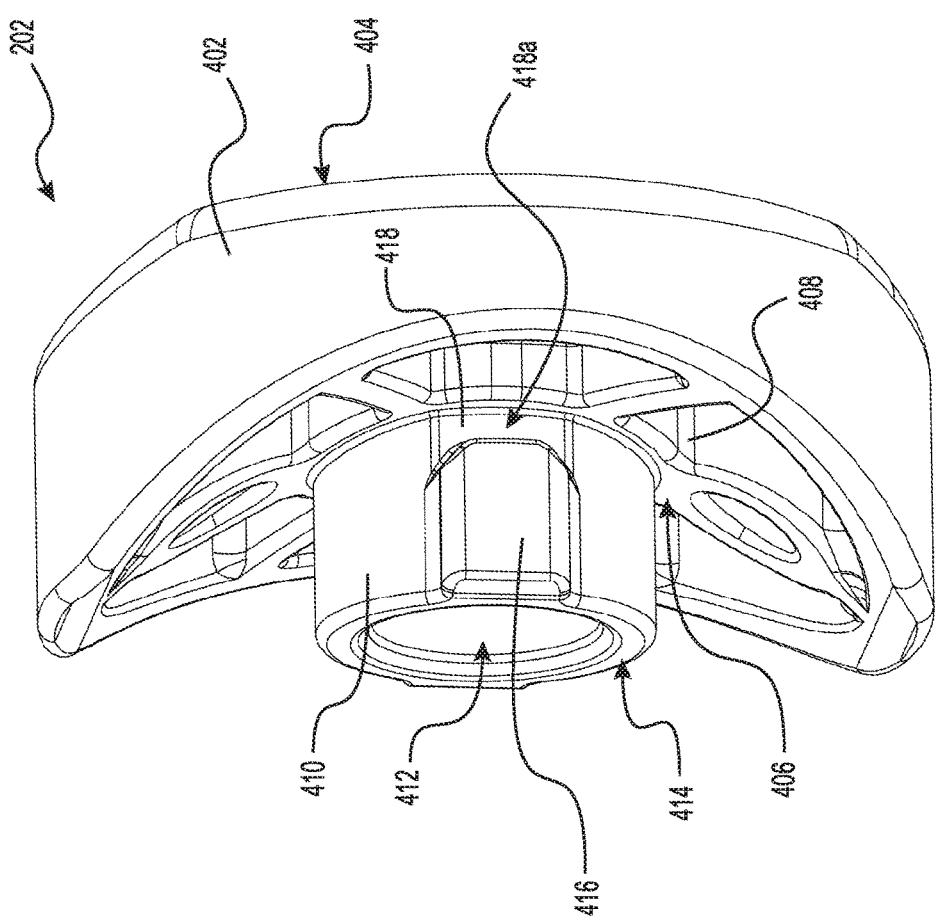
FIG. 4 is a perspective view taken from a front, right side of the anchor of FIG. 3A.
Figure 5:
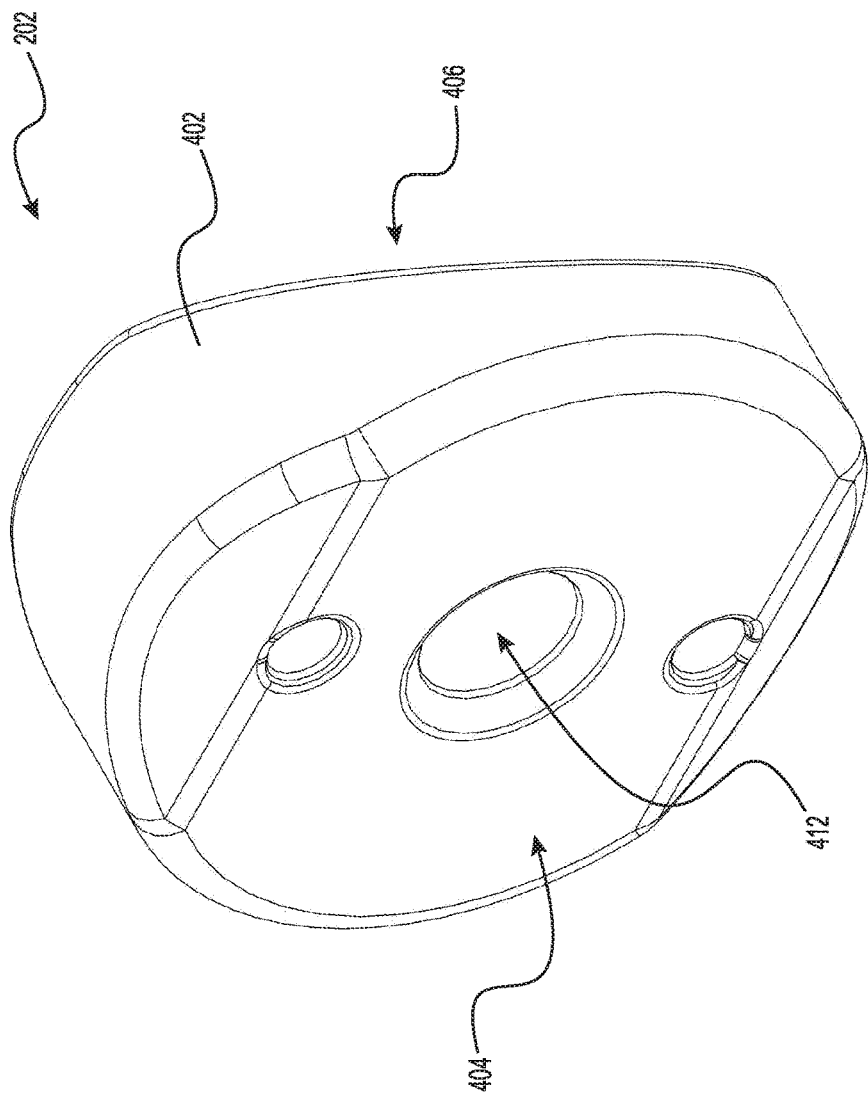
FIG. 5 is a perspective view taken from a rear, left side of the anchor of FIG. 4.

As best shown in FIGS. 4, 6B and 6C, the projections 416 are spaced from the surface 406 of the anchor 202. A portion 418 of the shank 410 that extends between the projections 416 and the surface 406 has two opposed flat surfaces 418a, 418b (FIGS. 3D, 6B and 6C) that define a width 320 (FIG. 3D) therebetween.

The opposed flat surfaces 418a, 418b are parallel to each other. It is contemplated that the opposed flat surfaces 418a, 418b could be non-parallel to each other. It is contemplated that the portion 418 could have a different shape that has no opposed flat surfaces. For example, the portion 418 could have a circular cross-section. The portion 418 will be described in more detail below.

The anchor 202 is symmetric about a line 608 (FIG. 6A) passing through a center of the two projections 417 and the shank 410. It is contemplated that the anchor 202 could be asymmetric about the line 608. Similarly, the anchor 202 is symmetric about a line 610 (FIG. 6A) perpendicular to the line 608 and passing through the center of the shank 410. It is contemplated that the anchor 202 could be asymmetric about the line 610.

Figure 3E:
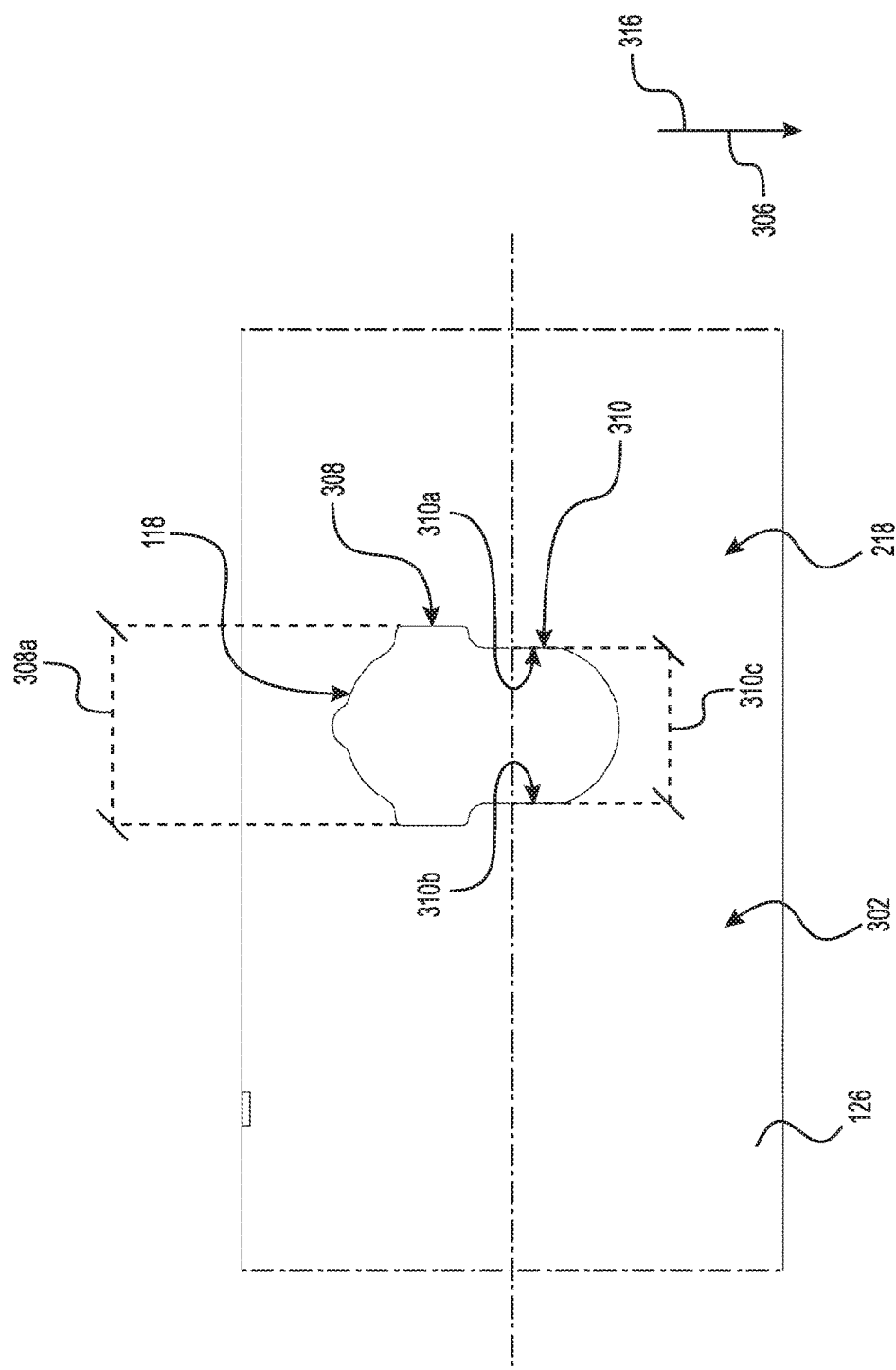
FIG. 3E is a left side elevation view of the portion of the frame member shown in FIG. 3D with an anchor removed.

Turning to FIGS. 3D and 3E, the slot 118, through which the shank 410 of the anchor 202 will pass, will now be described in more detail. The slot 118 has a wider portion 308 and a narrower portion 310 extending downward 316 from the wider portion 308, in a direction of gravity 306. In the present implementation, the narrower portion 310 is vertically below the wider portion 308 and is defined in part by two opposed flat surfaces 310a, 310b of an outer wall 302 of the frame member 126 in which the slot 118 is defined. It is contemplated that the narrower portion 310 need not be below the wider portion 308. It is contemplated that the slot 118 could have a shape that is different from the shape shown in FIG. 3E.

In one aspect, and as will be described in more detail below, the anchor 202 is installed by inserting the shank 410 and the projections 416 into the frame member 126 via the wider portion 308 of the slot 118 and then moving the anchor 202 downward 316 (FIGS. 3A to 3E) relative to the frame member 126 to move the shank 410 into the narrower portion 310 of the slot 118 to removably secure the anchor 202 on the frame member 126.

To this end, the wider portion 308 of the slot 118 has a first width 308a and is dimensioned to permit passage of the shank 410 and the projections 416 therethrough so that the shank 410 and the projections 416 could be inserted into the frame member 126 via the wider portion 308.

From a different perspective, the shank 410 and the projections 416 are dimensioned to be narrower than the wider portion 308 so that the shank 410 and the projections 416 could be inserted into the frame member 126 via the wider portion 308 of the slot 118.

On the other hand, the narrower portion 310 of the slot 118 has a second width 310c (FIG. 3D) and is dimensioned to allow passage of the shank 410 into the narrower portion 310 but to prevent passage of the projections 416 through the narrower portion 310. To this end, the shank 410 is dimensioned to be narrower than the narrower portion 310 but the projections 416 are dimensioned to be wider than the narrower portion 310.

In the present implementation, when the shank 410 and the projections 416 are inserted into the wider portion 308 of the slot 118 and are then released, the anchor 202 drops and the shank 410 enters the narrower portion 310 of the slot 118 by gravity 306.

It is contemplated that the shank 410 could be dimensioned such that the portion 418 of the shank 410 would contact the opposed flat surfaces 310a, 310b when the shank 410 is positioned in the narrower portion 310 of the slot 118. In some such cases, a manual force may need to be applied to the anchor 202 after the shank 410 and the projections 416 are inserted into the wider portion 308 of the slot 118 to move the shank 410 from the wider portion 308 into the narrower portion 310.

Turning now to FIG. 3D, in another aspect, in the present implementation, the shank 410 is dimensioned such that when the portion 418 of the shank 410 is positioned in the narrower portion 310 of the slot 118, the opposed flat surfaces 418a, 418b of the shank 410 touch the opposed flat surfaces 310a, 310b of the narrower portion 310, at least when a torque is applied to the shank 410 about the aperture 412 in the shank 410, to reduce or prevent rotation of the anchor 202 relative to the frame member 126.

It is contemplated that the shank 410 could have a single flat surface instead of the two opposed flat surfaces 418a, 418b, or more than two opposed flat surfaces 418a, 418b positioned and dimensioned to engage at least one of the opposed flat surfaces 310a, 310b of the narrower portion 310 of the slot 118 to reduce or prevent rotation of the shank 410 in the narrower portion 310.

Referring now to FIGS. 3A to 3D, the anchor 202 once installed in the slot 118 will now be described in more detail. As shown in FIGS. 3A to 3D, the anchor 202 is positioned relative to the frame member 126 such that the shank 410 is in the narrower 310 portion of the slot 118.

In this position, a portion of the outer wall 302 of the frame member 126 is positioned between the projections 416 and the surface 406 of the anchor 202 and thereby prevents the projections 416 from exiting the frame member 126 via the narrower portion 310 of the slot 118 in a direction 318 (FIGS. 3A to 3C, 6B and 6C) that is generally orthogonal to the surface 404 of the anchor 202. The direction 318 is additionally shown in FIG. 3D with a rear end of an arrow 318 directed into the page of FIG. 3D.

As best shown in FIGS. 3B and 3C, in the present implementation the projections 416 contact an inner surface 304 of the outer wall 302. It is contemplated that the projections 416 could be spaced further into the frame member 126 (in a direction 322 shown in FIGS. 3A, 3B, 6B and 6C) away from the surface 406 of the anchor 202, such that the projections 416 would be positioned further inside the frame member 126 and would not contact the inner surface 304. That is, the projections 416 could be spaced from the surface 406 by a distance larger than a thickness 314 of the outer wall 302 of the frame member 126 proximate the slot 118.

As best shown in FIG. 3A, the bolt 208a extends through the aperture 200a in the rock slider 136 and the frame aperture 312 defined in the frame member 126. The bolt 208a is received in the aperture 412 in the shank 410. In the present implementation, the bolt 208a is matingly received in the aperture 412 by being threaded into the aperture 412. The bolt 208a compresses the frame member 126 with the anchor 202 and the rock slider 136, and holds the anchor 202 and the rock slider 136 on the frame member 126.

A method of attaching the rock slider 136 to the frame member 126 is described next, with reference to FIGS. 1A, 1B, 3A, 3B and 8 to 11.

As shown in FIGS. 1A and 1B, some of the panels 116 of the vehicle 100 interfere with the attachment of the rock slider 136 to the vehicle frame 102 and need to be modified to permit for the attachment to take place.

More particularly, as shown in FIGS. 1A and 1B, three holes 140, 142, 144 need to be made in the panels 116 over the slots 118, 120, 122, respectively. This way, the three transverse members 212, 222, 210 of the rock slider 136 that receive the bolts 208a, 208b, 208c can be inserted through corresponding ones of the holes 140, 142, 144 made in the panels 116 to contact respective ones of the frame members 124, 126 as shown in FIGS. 2, 3A, 3B and 8 to 11.

It is contemplated that other vehicles could have other panels and/or other parts that could interfere with the attachment of the rock slider 136 to the vehicle frame 102, and/or could have no panels or other parts that would interfere with the attachment of the rock slider 136 to the vehicle frame 102. Accordingly, where a vehicle has no parts that would interfere with the attachment of the rock slider 136 to the vehicle frame 102, the method would exclude steps of modifying or temporarily removing such parts.

As shown by FIGS. 8 and 9, after the holes 140, 142, 144 have been made in the panels 116, the shank 410 of the anchor 202 is inserted into the wider portion 308 of the slot 118. Then, the anchor 202 is moved downward 316 (FIG. 9) relative to the frame member 126 to position the shank 410 of the anchor 202 in the narrower portion 310 of the slot 118 (FIG. 10) and to thereby removably secure the anchor 202 on the frame member 126. The same steps are then repeated with the anchor 204 and the slot 120 and with the anchor 206 and the slot 122. It is contemplated that the anchors 202, 204, 206 could be removably secured on corresponding ones of the frame members 124, 126 in any order.

Once the anchors 202, 204, 206 are installed on corresponding ones of the frame members 124, 126, the transverse members 212, 222, 210 of the rock slider 136 are inserted into the holes 140, 142, 144, respectively. Then, the apertures 200a, 200b, 200c in the transverse members 212, 222, 210 are aligned with the apertures in the frame members 124, 126 (i.e. aperture 312 for frame member 124) and the apertures 412 in the shanks 410 of the anchors 202, 204, 206, respectively.

Figure 10:
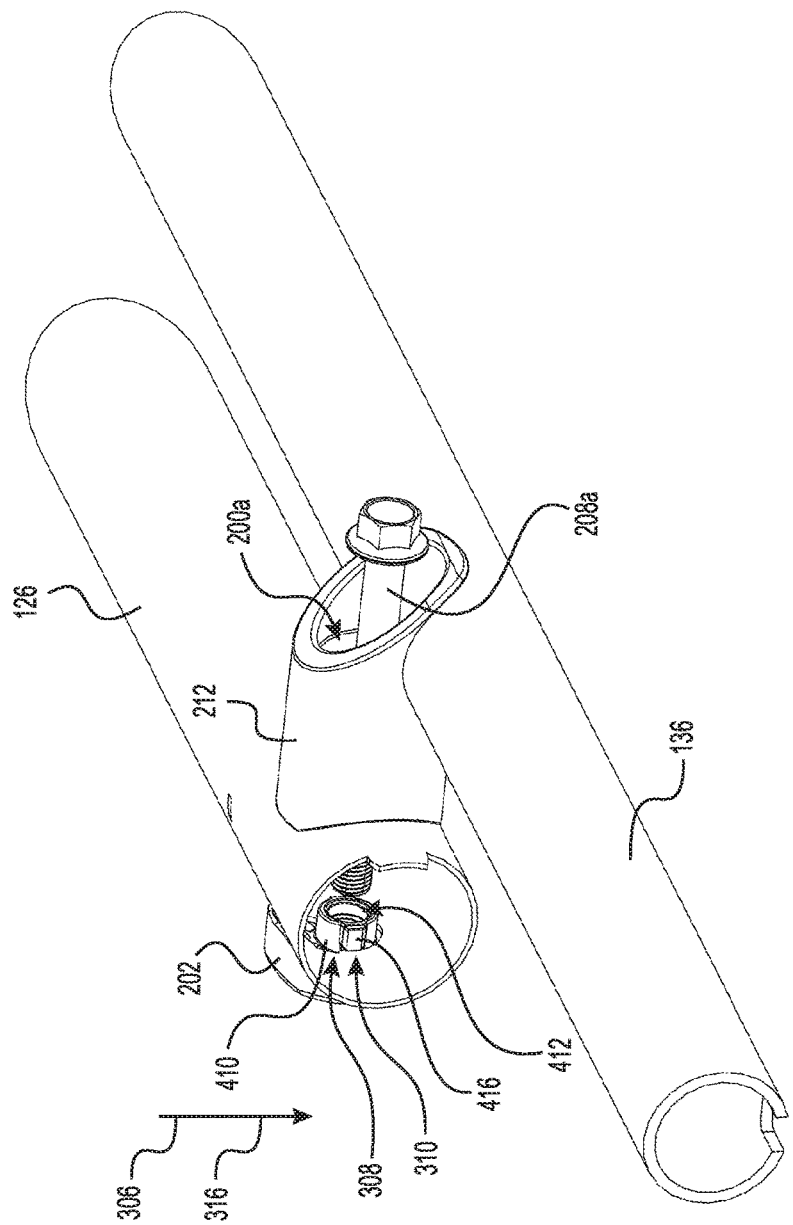
Figure 11:
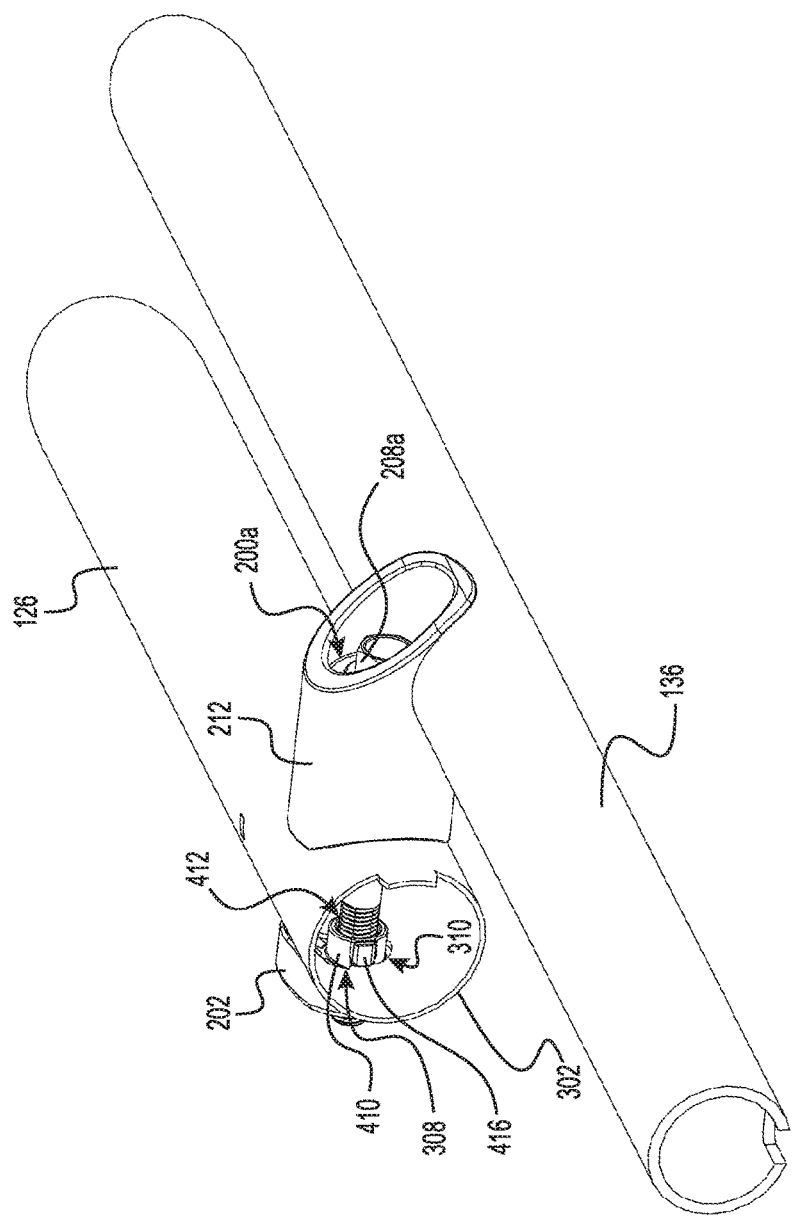

Then, as shown in FIG. 10, the bolt 208a is inserted through the aperture 200a, the frame aperture 312 (FIGS. 8, 9), and into the aperture 412 of anchor 202. The bolt 208a is partially tightened by hand in the aperture 412. Then, similarly, the bolt 208b is inserted through the aperture 200b and the corresponding frame aperture of the frame member 124, and into the aperture of the shank of the anchor 204 and is partially tightened by hand therein. Then, the bolt 208c is inserted through the aperture 200c and the corresponding frame aperture of the frame member 126, and into the aperture of the shank of the anchor 206 and is partially tightened by hand therein. Then, as shown in FIG. 11 with respect to the bolt 208a, the bolts 208a, 208b, 208c are tightened with a suitable tool, such as a wrench, to complete the attachment of the rock slider 136. It is contemplated that the bolts 208a, 208b, 208c could be inserted and tightened in any order.

In the present implementation, rotation of the anchors 202 and 206 relative to the frame member 126, and rotation of the anchor 204 relative to the frame member 124, is prevented during the tightening of corresponding ones of the bolts 208a, 208b, 208c. The prevention of rotation is, in part, due to the engagement (as described above) between the opposed flat surfaces of the shanks of the anchors 202, 204, 206 with corresponding ones of the opposed flat surfaces of the slots 118, 120, 122.

In the present implementation, the prevention of rotation of the anchors 202, 204, 206 is also in part due to the concavity of the anchors 202, 204, 206. For example, as best shown in FIGS. 3A and 3B, when the anchor 202 is removably secured on the frame member 126, the outer wall 302 of the frame member 126 is disposed in part in the concavity of the anchor 202 and the convex outer surface 218 of the outer wall 302 engages the concave surface 406 of the anchor 202. When the bolt 208a is being tightened in the aperture 412, the bolt 208a presses the anchor 202, and therefore also the concave surface 406, against the convex outer surface 218 and thereby increases engagement between the concave surface 406 and the convex outer surface 218.

The increasing engagement between the convex outer surface 218 and the concave surface 406 reduces the ability of the anchor 202 to rotate relative to the frame member 126 while the bolt 208a is being tightened. In the present implementation, the increasing engagement prevents rotation of the anchor 202 relative to the frame member 126 while the bolt 208a is being tightened. The same is true for the anchors 204 and 206.

When removably secured on the frame member 126, the anchor 202 has a first portion between a plane 330 (FIG. 3A) and the frame member 126, and another portion on the opposite side of plane 330. The plane 330 is perpendicular to a bolt axis 336 and tangent to the outer wall 302. The portion of the anchor 202 between the plane 330 and the frame member 126 makes contact with the outer wall 302 in a direction parallel with the bolt axis 336 as a result of the tightening of the bolt 208a.

During the tightening of the bolt 208a, the portions 332, 334 of the concave shape of the anchor 202 engage the outer wall 302 of the corresponding frame member 126 and, in combination with the engagement between the opposed flat surfaces 418a, 418b of the shank 410 and the opposed flat surfaces 310a, 310b of the slot 118, oppose the torque applied to the anchor 202 by the bolt 208a and thereby prevent rotation of the anchor 208a about the bolt axis 336. If the surface 406 of the anchor 202 was flat instead of concave, and if the shank 410 was cylindrical and did not have the flat surfaces 418a, 418b, the anchor 202 would rotate about the bolt axis 336 during the tightening of the bolt 208a. The same is true for the anchors 204 and 206.

In a further aspect, it is contemplated that the steps of the method could be performed in a different sequence. For example, in another implementation of the method, after the holes 140, 142, 144 have been made in the panels 116, the shank of the anchor 204 (FIG. 2) is inserted into the wider portion of the slot 120. Then, the anchor 204 is moved downward 316 relative to the frame member 124 to position the shank of the anchor 204 in the narrower portion of the slot 120 and to thereby removably secure the anchor 204 on the frame member 124 as described above with respect to the anchor 202 and the frame member 126 and shown in FIGS. 8 and 9.

Then, the transverse member 222 is inserted into the hole 142 in the panels 116 and the aperture 200b in the transverse member 222 is aligned with the apertures in the frame member 124 and the slot 120. Then, the bolt 208b is inserted through the aperture 200b in the transverse member 222 and through the frame aperture (in the frame member 124) corresponding to the slot 120. Then, the bolt 208b is fastened to the anchor 204 by being threaded into the aperture in the shank of the anchor 204 and being tightened therein. At this point, the rock slider 136 is held in place on the frame member 124 by the anchor 204 and the bolt 208b.

Next, the foregoing steps are repeated with respect to the anchor 202, the bolt 208a, the transverse member 212, the frame aperture 312 and the slot 118 to attach the rock slider 136 to the frame member 126 with the anchor 202 and the bolt 208a. Then, the foregoing steps are repeated with respect to the anchor 206, the bolt 208c, the transverse member 210, the slot 122 and the frame aperture (in frame member 126) corresponding to the slot 122 to attach the rock slider 136 to the frame member 126 with the anchor 206 and the bolt 208c. It is contemplated that after the rock slider 136 is initially held in place on the frame member 124 with only the anchor 204 and the bolt 208b, the rock slider 136 could be additionally attached to the frame member 126 first with the anchor 206 and the bolt 208c, and last with the anchor 202 and the bolt 208a. It is also contemplated that either one of the anchors 202, 206 could be used to first fasten the rock slider 136 to the frame member 126 and then the remaining two anchors could be used in any order.

Additional aspects of the present technology are described next.

It is contemplated that anchors of the present technology could be sold on their own, as part of a kit, and/or as part of an assembly. In some cases, a kit would include at least one anchor 202 and at least one bolt 208a corresponding to the at least one anchor 202. In some cases, an assembly would include at least one anchor 202, at least one bolt 208*a* corresponding to the at least one anchor 202 and at least one component, such as the rock slider 136, adapted to be attached to a frame member using the at least one anchor 202 and the at least one bolt 208*a*.

The vehicle 100, assemblies, anchors 202, 204, 206, and methods implemented in accordance with some non-limiting implementations of the present technology can be represented as presented in the following numbered clauses.

CLAUSE 1. An anchor 202 for removably attaching a component 136 to a frame member 126 having an outer surface 218 and a slot 118 defined in the outer surface 218, the anchor 202 comprising: a body 402 having a first surface 404 and a second surface 406 opposite the first surface 404; a shank 410 extending from the second surface 406, the shank 410 being sized to be received in the slot 118, the shank 410 defining an aperture 412 extending from a free end of the shank 410 toward the first surface 404, the aperture 412 being adapted to receive a fastener 208*a*; and at least one projection 416 extending from a side of the shank 410, the at least one projection 416 being spaced from the second surface 406.

CLAUSE 2. The anchor 202 of clause 1, wherein the aperture 412 is threaded.

CLAUSE 3. The anchor 202 of clause 1 or 2, wherein the aperture 412 extends to the first surface 404.

CLAUSE 4. The anchor 202 of any one of clauses 1 to 3, wherein the second surface 406 is generally complementary in shape to a portion of the outer surface 218 surrounding the slot 118.

CLAUSE 5. The anchor 202 of any one of clauses 1 to 4, wherein the second surface 406 is generally concave.

CLAUSE 6. The anchor 202 of any one of clauses 1 to 5, wherein the at least one projection 416 is at least two projections.

CLAUSE 7. The anchor 202 of clause 6, wherein the at least two projections are positioned symmetrically about the shank 410.

CLAUSE 8. The anchor 202 of any one of clauses 1 to 7, wherein the anchor 202 is symmetric about a line passing through the at least one projection 416 and the shank 410.

CLAUSE 9. A component assembly, comprising the frame member 126 and the anchor 202 of clause 6 or 7, wherein: the shank 410 has a diameter defined by an outer surface 218 of the shank 410; and the at least two projections define a reference diameter that is larger than the diameter of the shank 410.

CLAUSE 10. The component assembly of clause 9, wherein: the slot 118 has a first portion 308 and a second portion 310 extending downward from the first portion 308; a width of the second portion 310 is smaller than a width of the first portion 308; and the reference diameter is greater than the width of the second portion 310.

CLAUSE 11. The component assembly of clause 9 or 10, wherein: the slot 118 is defined in an outer wall of the frame member 126, and the at least two projections are spaced from the second surface 406 by a distance larger than a thickness of the outer wall proximate the slot 118.

CLAUSE 12. A component assembly, comprising: a component 136; an anchor 202 comprising: a body 402 having a first surface 404 and a second surface 406 opposite the first surface 404, a shank 410 extending from the second surface 406, the shank 410 being sized to be received in a slot 118 defined in an outer surface 218 of a frame member 126, the shank 410 defining an aperture 412 extending from a free end of the shank 410 toward the first surface 404; and at least one projection 416 extending from a side of the shank 410, the at least one projection 416 being spaced from the second surface 406; and a fastener 208*a* received through the component 136 and into the aperture 412 of the shank 410 for fastening the component 136 to the frame member 126.

CLAUSE 13. The component assembly of clause 12, wherein the aperture 412 is threaded and the fastener 208*a* is threaded into the aperture 412.

CLAUSE 14. The component assembly of clause 12 or 13, wherein the aperture 412 extends to the first surface 404.

CLAUSE 15. The component assembly of any one of clauses 2 to 14, wherein the at least one projection 416 is at least two projections.

CLAUSE 16. The component assembly of any one of clauses 2 to 15, wherein the second surface 406 is generally complementary in shape to a portion of the outer surface 218 surrounding the slot 118.

CLAUSE 17. The component assembly of any one of clauses 2 to 16, wherein the second surface 406 is generally concave.

CLAUSE 18. The component assembly of any one of clauses 2 to 18, wherein the component 136 is a vehicle accessory 136.

CLAUSE 19. A vehicle, comprising: a vehicle frame 102, the vehicle frame 102 having a frame member 126, the frame member 126 having an outer surface 218, a slot 118 defined in the outer surface 218 and a frame aperture 312 defined in the outer surface 218 opposite the slot 118; at least two ground-engaging members 112, 114 operatively connected to the vehicle frame 102; an anchor 202 comprising: a body 402 having a first surface 404 and a second surface 406 opposite the first surface 404, a shank 410 extending from the second surface 406, the shank 410 defining an aperture 412 extending from a free end of the shank 410 toward the first surface 404, the shank 410 being received in the slot 118, and at least one projection 416 extending from a side of the shank 410, the at least one projection 416 being spaced from the second surface 406 and being positioned inside the frame member 126, at least a portion of the frame member 126 being positioned between the at least one projection 416 and the second surface 406; a vehicle component 136 positioned at least in part over the frame aperture 312; and a fastener 208*a* received through the vehicle component 136, the frame aperture 312, inside the frame member 126 and in the aperture 412 of the shank 410 of the anchor 202 for fastening the vehicle component 136 to the frame member 126.

CLAUSE 20. The vehicle of clause 19, wherein the aperture 412 of the shank 410 extends to the first surface 404 of the anchor 202 and the fastener 208*a* extends through the aperture 412 of the shank 410.

CLAUSE 21. The vehicle of clause 19 or 20, wherein the second surface 406 of the anchor 202 is generally complementary in shape to a portion of the outer surface 218 of the frame member 126 surrounding the slot 118.

CLAUSE 22. The vehicle of any one of clauses 9 to 22, wherein: the slot 118 has a first portion 308 and a second portion 310; the first portion 308 is sized to permit passage of the shank 410 and the at least one projection 416 therethrough; the second portion 310 is sized to receive the shank 410 therein and to prevent passage of the at least one projection 416 therethrough; and the shank 410 is positioned in the second portion 310 when fastened to the fastener 208*a*.

CLAUSE 23. The vehicle of clause 22, wherein the second portion 310 is vertically below the first portion 308.

CLAUSE 24. The vehicle of any one of clauses 9 to 23, wherein the vehicle component 136 is a vehicle accessory 136.

CLAUSE 25. A method of attaching a component 136 to a frame member 126, the frame member 126 having an outer surface 218, a slot 118 defined in the outer surface 218 and a frame aperture 312 defined in the outer surface 218 opposite the slot 118, the method comprising: inserting a shank 410 and at least one projection 416 of an anchor 202 into a first portion 308 of the slot 118, the at least one projection 416 extending from a side of the shank 410; moving the anchor 202 relative to the frame member 126 such that: the shank 410 moves from the first portion 308 of the slot 118 into a second portion 310 of the slot 118, and at least a portion of the frame member 126 is positioned between the at least one projection 416 and a body 402 of the anchor 202; positioning the component 136 at least in part over the frame aperture 312; and fastening the component 136 to the frame member 126 by inserting a fastener 208a through the component 136, the frame aperture 312, inside the frame member 126 and into an aperture 412 defined in the shank 410.

Modifications and improvements to the above-described implementations of the present technology may become apparent to those skilled in the art. The foregoing description is intended to be exemplary rather than limiting.

The invention claimed is:

1. An anchor for removably attaching a component to a frame member having an outer surface and a slot defined in the outer surface, the anchor comprising:
   a body having a first surface and a second surface opposite the first surface;
   a shank extending from the second surface, the shank being sized to be received in the slot, the shank defining an aperture extending from a free end of the shank toward the first surface, the aperture being adapted to receive a fastener; and
   at least one projection extending from a side of the shank, the at least one projection being spaced from the second surface.

2. The anchor of claim 1, wherein the aperture is threaded.

3. The anchor of claim 1, wherein the aperture extends to the first surface.

4. The anchor of claim 1, wherein the second surface is generally complementary in shape to a portion of the outer surface surrounding the slot.

5. The anchor of claim 4, wherein the second surface is generally concave.

6. The anchor of claim 1, wherein the at least one projection is at least two projections.

7. The anchor of claim 6, wherein the at least two projections are positioned symmetrically about the shank.

8. The anchor of claim 1, wherein the anchor is symmetric about a line passing through the at least one projection and the shank.

9. A component assembly, comprising the frame member and the anchor of claim 7, wherein:
   the shank has a diameter defined by an outer surface of the shank; and
   the at least two projections define a reference diameter that is larger than the diameter of the shank.

10. The component assembly of claim 9, wherein:
   the slot has a first portion and a second portion extending downward from the first portion;
   a width of the second portion is smaller than a width of the first portion; and
   the reference diameter is greater than the width of the second portion.

11. The component assembly of claim 9, wherein:
   the slot is defined in an outer wall of the frame member, and
   the at least two projections are spaced from the second surface by a distance larger than a thickness of the outer wall proximate the slot.

12. A component assembly, comprising:
   a component;
   an anchor comprising:
      a body having a first surface and a second surface opposite the first surface,
      a shank extending from the second surface, the shank being sized to be received in a slot defined in an outer surface of a frame member, the shank defining an aperture extending from a free end of the shank toward the first surface; and
      at least one projection extending from a side of the shank, the at least one projection being spaced from the second surface; and
   a fastener received through the component and into the aperture of the shank for fastening the component to the frame member.

13. The component assembly of claim 12, wherein the aperture is threaded and the fastener is threaded into the aperture.

14. The component assembly of claim 12, wherein the aperture extends to the first surface.

15. The component assembly of claim 12, wherein the at least one projection is at least two projections.

16. The component assembly of claim 12, wherein the second surface is generally complementary in shape to a portion of the outer surface surrounding the slot.

17. The component assembly of claim 16, wherein the second surface is generally concave.

18. The component assembly of claim 12, wherein the component is a vehicle accessory.

19. A vehicle, comprising:
   a vehicle frame, the vehicle frame having a frame member, the frame member having an outer surface, a slot defined in the outer surface and a frame aperture defined in the outer surface opposite the slot;
   at least two ground-engaging members operatively connected to the vehicle frame;
   an anchor comprising:
      a body having a first surface and a second surface opposite the first surface,
      a shank extending from the second surface, the shank defining an aperture extending from a free end of the shank toward the first surface, the shank being received in the slot, and
      at least one projection extending from a side of the shank, the at least one projection being spaced from the second surface and being positioned inside the frame member, at least a portion of the frame member being positioned between the at least one projection and the second surface;
   a vehicle component positioned at least in part over the frame aperture; and
   a fastener received through the vehicle component, the frame aperture, inside the frame member and in the aperture of the shank of the anchor for fastening the vehicle component to the frame member.

20. The vehicle of claim 19, wherein the aperture of the shank extends to the first surface of the anchor and the fastener extends through the aperture of the shank.

21. The vehicle of claim 19, wherein the second surface of the anchor is generally complementary in shape to a portion of the outer surface of the frame member surrounding the slot.

22. The vehicle of claim 19, wherein:
the slot has a first portion and a second portion;
the first portion is sized to permit passage of the shank and the at least one projection therethrough;
the second portion is sized to receive the shank therein and to prevent passage of the at least one projection therethrough; and
the shank is positioned in the second portion when fastened to the fastener.

23. The vehicle of claim 22, wherein the second portion is vertically below the first portion.

24. The vehicle of claim 19, wherein the vehicle component is a vehicle accessory.

25. A method of attaching a component to a frame member, the frame member having an outer surface, a slot defined in the outer surface and a frame aperture defined in the outer surface opposite the slot, the method comprising:
inserting a shank and at least one projection of an anchor into a first portion of the slot, the at least one projection extending from a side of the shank;
moving the anchor relative to the frame member such that:
the shank moves from the first portion of the slot into a second portion of the slot, and
at least a portion of the frame member is positioned between the at least one projection and a body of the anchor;
positioning the component at least in part over the frame aperture; and
fastening the component to the frame member by inserting a fastener through the component, the frame aperture, inside the frame member and into an aperture defined in the shank.

\* \* \* \* \*